US005191408A

United States Patent [19]

Takanashi et al.

[11] Patent Number: 5,191,408

[45] Date of Patent: Mar. 2, 1993

[54] COLOR IMAGING SYSTEM WITH SELECTIVELY OPENABLE OPTICAL SHUTTER

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Japan

[21] Appl. No.: 662,665

[22] Filed: Feb. 28, 1991

[30] Foreign Application Priority Data

| | | | |
|---|---|---|---|
| Feb. 28, 1990 | [JP] | Japan | 2-48112 |
| Mar. 2, 1990 | [JP] | Japan | 2-51288 |
| Mar. 9, 1990 | [JP] | Japan | 2-58708 |
| Apr. 12, 1990 | [JP] | Japan | 2-97260 |
| May 21, 1990 | [JP] | Japan | 2-130499 |
| Sep. 17, 1990 | [JP] | Japan | 2-246716 |

[51] Int. Cl.[5] ........ H04N 1/028; H04N 1/46; H04N 3/10; H04N 3/15; H04N 5/30; H04N 9/07; G02F 1/135

[52] U.S. Cl. ........ 358/49; 358/44; 358/55; 358/213.13; 358/225; 358/909; 358/471; 359/72; 359/250; 359/252; 359/255; 365/108; 365/112

[58] Field of Search ........ 358/44, 49, 55, 213.13, 358/225, 41, 43, 209, 213.26, 909, 471; 359/72, 250, 252, 255; 365/108, 112

[56] References Cited

U.S. PATENT DOCUMENTS 4,956,714 9/1990 Takanashi et al. .

FOREIGN PATENT DOCUMENTS 63-168618 7/1988 Japan .
63-289707 11/1988 Japan .
1-68190 3/1989 Japan .
1-189045 7/1989 Japan .
1-190178 7/1989 Japan .
1-213619 8/1989 Japan .
1-319384 12/1989 Japan .
2-820 1/1990 Japan .
2-35639 2/1990 Japan .
2-78387 3/1990 Japan .
2-222924 9/1990 Japan .
2-267519 11/1990 Japan .

OTHER PUBLICATIONS

"Television and Image Engineering Handbook", Dec. 30, 1980, p. 139.

*Primary Examiner*—Benjamin R. Fuller
*Assistant Examiner*—Scott A. Rogers
*Attorney, Agent, or Firm*—Lowe, Price, LeBlanc & Becker

[57] ABSTRACT

A color imaging system for use as an electronic still camera, for example, includes a color separator for separating the optical image of a subject from a lens into a plurality of different color images, an optical shutter selectively openable for transmitting the optical image of the subject to the color separator, a photoconductive layer for converting the different color images into respective electric charge images, and an information recording medium for recording images corresponding to the electric charge images under an electric field developed between the photoconductive layer and the information recording medium. The timing with which the optical shutter is opened and the timing with which the electric field is generated by the power supply, are controlled by a control unit depending on imaging conditions selected by the user. The color imaging system also has an optical viewfinder for allowing the user to visually observe the optical image of the subject introduced by the lens.

42 Claims, 28 Drawing Sheets

COLOR IMAGING SYSTEM WITH SELECTIVELY OPENABLE OPTICAL SHUTTER

BACKGROUND OF THE INVENTION

1. Field of the Invention

The present invention relates to a color imaging system for use as an electronic still camera, for example.

2. Prior Art

Heretofore, the optical images of subjects are recorded using optical photographic cameras or combinations of television cameras and video tape recorders. It has also been customary to record audio information as well as image information on various recording mediums such as cinematographic films, magnetic video tapes, or the like.

Optical images recorded on photographic films with silver-salt light-sensitive photographic emulsions are of relatively high resolution, but can be reproduced only after being processed by the complex development process. Imaging devices such as television camera tubes produce video signals representative of optical images, and such produced video signals are typically recorded on magnetic video tapes by video tape recorders. While the recorded video images can quickly be reproduced, the reproduced video images are relatively low in resolution because the electron beams used in the television camera tubes are of limited diameter. Since the capacitance of the target in the camera tubes increases with the surface area of the target, the image resolution cannot be increased even if the target surface area is increased. Video signals indicative of moving images, which are produced by the television camera tubes, have frequencies ranging from several tens MHz to several hundreds MHz. These video signals will be poor in signal-to-noise ratio if the resolution is increased. Therefore, the television camera tubes cannot produce video signals of desired high quality and high resolution. Solid-state imaging devices for use in television cameras are also subject to limitations since it is difficult to two-dimensional solid-state sensors with as many pixels as required to achieve desired levels of image quality and resolution. Video tape recorders available on the market are not yet advanced enough to record and reproduce video signals in a wide frequency range for desired image quality and resolution.

There has recently been proposed an imaging system for recording images as highly fine electric charge images to make it possible to reproduce them with high quality and resolution. It has also been proposed to record electric charge images as representing video information such as still images and also electric charge images as representing audio information.

Such proposed imaging systems are disclosed in Japanese Patent Applications Nos. 61-311333, 62-226137, 62-305442, 63-122282, 63-289707, 1-89423, 1-189045, 1-291660, 1-319384, and Japanese Laid-Open Patent Publication No. 1-213619, for example.

However, the proposed imaging systems have not been satisfactory as they cannot easily be handled in practical applications.

SUMMARY OF THE INVENTION

It is an object of the present invention to provide a color imaging system which can be handled with ease.

According to the present invention, there is provided a color imaging system comprising a lens for introducing an optical image of a subject, color separating means for separating the optical image into a plurality of different color images, an optical shutter selectively openable for transmitting the optical image of the subject to the color separating means, photoelectric converting means for converting the different color images into respective electric charge images, an information recording medium for recording images corresponding to the electric charge images under an electric field, a power supply for generating the electric field between the photoelectric converting means and the information recording medium, control means for controlling the timing with which the optical shutter is opened and the timing with which the electric field is generated by the power supply, input means manually operable for supplying imaging conditions to the control means, and an optical viewfinder for visual observation of the optical image of the subject introduced by the lens.

According to the present invention, there is also provided a color imaging system comprising a lens for introducing an optical image of a subject, color separating means for separating the optical image into a plurality of different color images, an optical shutter selectively openable for transmitting the optical image of the subject to the color separating means, light-to-light converting means for converting the different color images into respective electric charge images, and for converting the electric charge images into secondary color images, respectively, under an electric field, a power supply for generating the electric field in the light-to-light converting means, and control means for individually controlling conversion of the electric charge images into the secondary color images.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
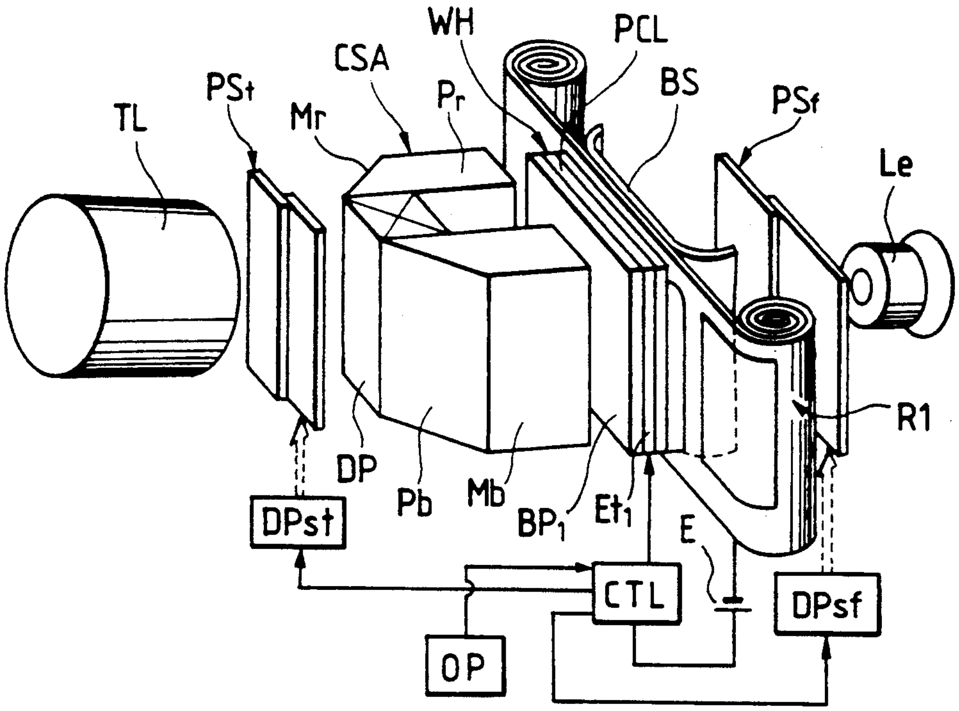
FIGS. 1 through 3 are perspective views, partly in block form, of color imaging systems according to embodiments of the present invention.

Like or corresponding parts are denoted by like or corresponding reference characters throughout views.

FIG. 1 shows a color imaging system according to an embodiment of the present invention.

As shown in FIG. 1, the color imaging system comprises a lens TL, an optical shutter PSt for the lens TL, a trichromatic color separator CSA, an image write head WH, an information recording medium RM, a holder BS for holding the information recording medium RM, an optical shutter PSf for a viewfinder (not shown), and a viewfinder eyepiece Le. The optical shutter PSt is positioned behind the lens TL, and the trichromatic color separator CSA is positioned behind the optical shutter PSt. The image write head WH and the information recording medium RM are disposed behind the trichromatic color separator CSA. The optical shutter PSf and the viewfinder eyepiece Le are positioned behind the holder BS. Each of the optical shutters PSt, PSf comprises a pair of movable blinds. The image write head WH includes a photoconductive layer PCL. The color imaging system also includes a control unit CTL, an operating unit OP for the user to apply various input signals to the control unit CTL, an actuator Dpst for actuating the optical shutter Pst, an actuator Dpsf for actuating the optical shutter Psf, and a power supply E. The information recording medium RM and the holder BS are transparent in nature.

The operating unit OP includes an input device, such as pushbuttons, key switches, or the like, which is manually operable by the user to establish an operating condition for the color imaging system. The operating unit OP applies, to the control unit CTL, an input signal which represents an established operating condition for the color imaging system.

If there is established an operating condition for focusing the optical image of a subject onto the photoconductive layer PCL of the image write head WH through the lens TL while the optical image is being viewed through the viewfinder by the user, then the control unit CTL applies control signals to the actuators Dpst, Dpsf to open the optical shutters PSt, PSf, respectively. Light from the subject now passes through the lens TL, the optical shutter PSt, the trichromatic color separator CSA, the image write head WH, the information recording medium RM, the holder BS, and the viewfinder eyepiece Le to the user's eye. While viewing the optical image represented by the light, the user moves the lens TL back and forth along the optical axis until the optical image is sharply focused on the photoconductive layer PCL of the image write head WH.

Then, the user selects an exposure condition and operates on the operating unit OP to apply an input signal representing the established exposure condition and also apply an input signal to start recording the optical image. The control unit CTL applies a control signal to the actuator Dpsf to close the optical shutter PSf and also applies a control signal to the actuator Dpst to keep the optical shutter PSt open only for a period of time necessary to meet the exposure condition which has been selected by the user and established through the operating unit OP. The control unit OP also operates to apply a voltage from the power supply E between a transparent electrode Et1 of the image write head WH and an electrode Et2 (see FIG. 4) of the information recording medium RM for a period of time required to meet a predetermined recording condition for the information recording medium RM. The structure of the information recording medium RM and the image recording process will be described later on.

The light from the subject passes through the lens TL and the optical shutter PS positioned therebehind, and is processed by the trichromatic color separator CSA into three color images, i.e., green, red, and blue images, which are then focused on the photoconductive layer PCL of the image write head WH.

The trichromatic color separator CSA comprises a dichroic prism DP and a pair of prisms Pr, Pb disposed one on each side of the dichroic prism DP and having respective fully reflecting surfaces Mr, Mb. The green image produced by the dichroic prism DP passes directly through the dichroic prism DP and is focused on the photoconductive layer PCL. The red image produced by the dichroic prism DP is reflected thereby into the prism Pr, and reflected by the fully reflecting surface Mr. The red image travels through the prism Pr and is focused on the photoconductive layer PCL. The blue image produced by the dichroic prism DP is reflected thereby into the prism Pb, and reflected by the fully reflecting surface Mb. The blue image travels through the prism Pb and is focused on the photoconductive layer PCL. The green, red, and blue images are focused on the photoconductive layer PCL in respective adjacent spaced areas thereon which are juxtaposed with guard bands therebetween.

As described above, the voltage from the power supply E is being applied between the transparent electrode Et1 of the image write head WH and the electrode Et2 of the information recording medium RM. Since the electric resistances of the areas of the photoconductive layer PCL where the respective optical images, i.e., the green, red, and blue images, are focused are of different values corresponding to these optical images, different field strengths corresponding to the optical images are developed between the photoconductive layer PCL and a recording layer CML (see FIG. 4) of the information recording medium RM, the layers PCL, CML being present between the electrodes Et1, Et2. Accordingly, pieces of image information which correspond respectively to the optical images are recorded on the recording layer CML.

FIGS. 4 through 9 show different arrangements in which color images are recorded on different information recording mediums using the color imaging system illustrated in FIG. 1.

Figure 4:
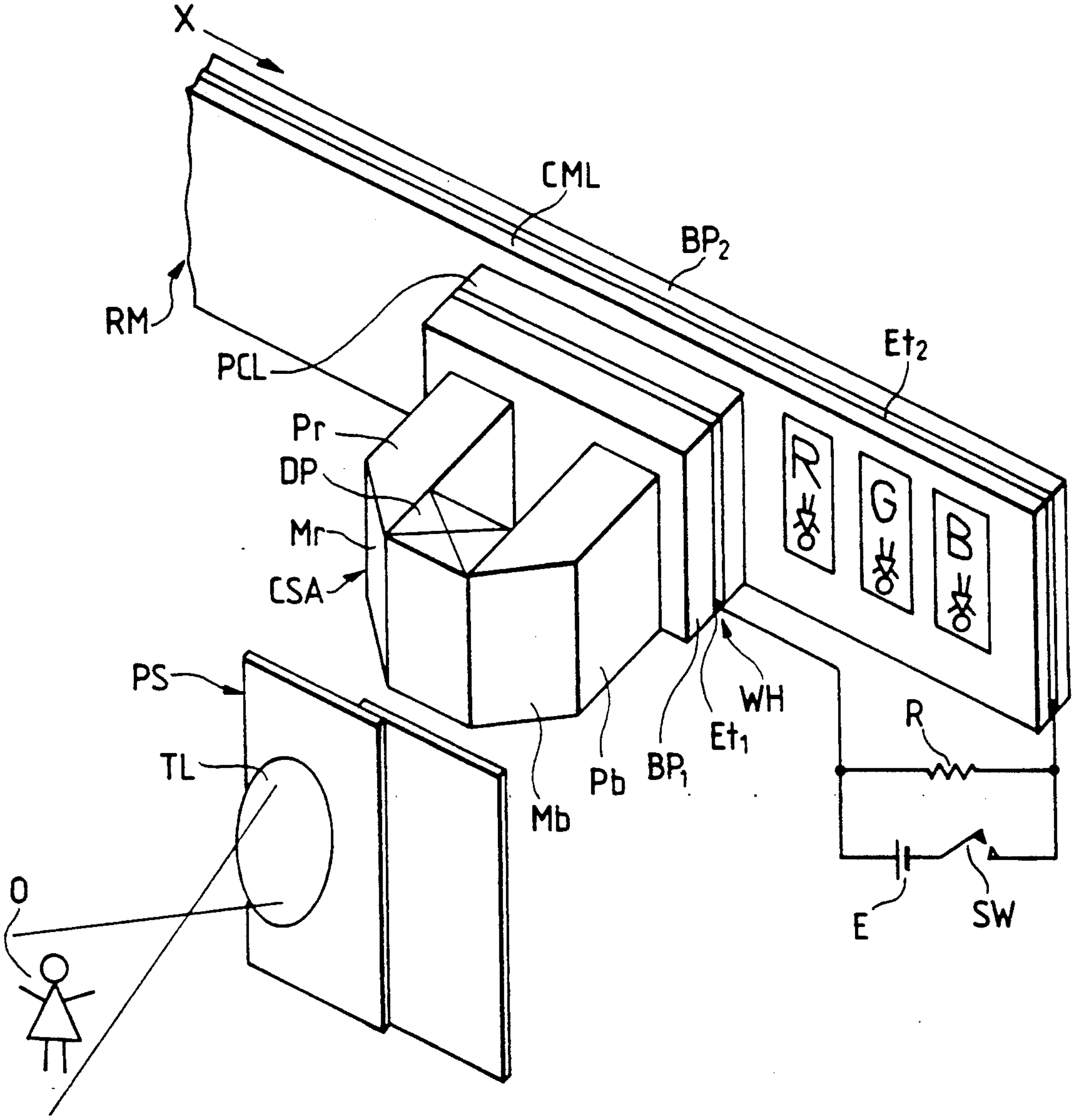
FIGS. 4 through 9 are views showing arrangements in which color images are recorded on different information recording mediums using a color imaging system according to the present invention.

In FIG. 4, the image write head H includes a transparent substrate BP1 such as of glass in addition to the electrode Et1 and the photoconductive layer PCL. The electrode Et1 is sandwiched between the transparent substrate BP1 and the photoconductive layer PCL, with the transparent substrate BP1 being positioned closely to the trichromatic color separator CSA. The information recording medium RM includes a substrate BP2 behind the electrode Et2 which is sandwiched between the recording layer CML and the substrate BP2. The recording layer CML is disposed in confronting relation to the photoconductive layer PCL. The power supply E is connected to the electrodes Et1, Et2 through a switch SW, and shunted by a resistor R. The other details shown in FIG. 4 are the same as those shown in FIG. 1. However, the holder BS, the viewfinder shutter PSf, the viewfinder eyepiece Le, the actuators Dpst, Dpsf, the operating unit OP, and the control unit CTL are omitted from illustration in FIG. 4.

The recording arrangement or system shown in FIG. 4 is in a phase of operation to apply the voltage from the power supply E between the electrodes Et1, Et2 for a period of time required to meet a predetermined recording condition for the information recording medium RM.

The recording layer CML may be either a charge storage layer capable of storing or holding an electric charge image corresponding to image information to be recorded, over a long period of time, or a light modulating layer capable of modifying or modulating an optical property such as optical polarization, optical dispersion, birefringence, optical rotation, or the like in response to the application of a voltage thereto.

The charge storage layer may comprise a membrane made of a material having a high electric resistance, a membrane made of a material having a high electric resistance with charge holding particles dispersed therein, or the like. For example, the charge storage layer may be made of silicone resin, liquid crystal, PLZT, an electrochromic material, or the like. The light modulating layer may be made of (a) a material whose optical property is modified only when an electric field is applied thereto, such as lithium niobate, liquid crystal, high polymer - liquid crystal compound membrane, BSO, or PLZT, or (b) a material which can store the intensity of an applied electric field as a change in an optical property thereof and can emit light having an intensity depending on the stored field intensity in response to the application of light having a certain intensity, such as high polymer - liquid crystal compound membrane, liquid crystal, or dispersive PLZT.

Liquid crystal, PLZT, and high polymer - liquid crystal compound membrane, which are referred to above may be used as either the material (a) or the material (b) since their optical properties may be varied by different compositions and different structures.

The high polymer - liquid crystal compound membrane used as the light modulating layer as the recording layer CML may comprise a porous high polymer material having a volume resistivity of $10^{14}$ Ωm or higher, such as methacrylic resin, polyester, polycarbonate resin, vinyl chloride, polyamide, polyethylene, polypropylene, polystyrene, silicone, or the like, the porous high polymer material having randomly located minute pores each having a diameter of about 0.5 microns or less, and a nematic or smectic liquid crystal, which exhibits a liquid crystal phase at room temperature and has a high volume resistivity, the nematic or smectic liquid crystal being sealed in those randomly located minute pores of the porous high polymer material.

If the randomly located minute pores are of a relatively large diameter, then an orientation pattern of the liquid crystal which is developed in the high polymer - liquid crystal compound membrane depending on an applied electric field that corresponds to an optical image remains unchanged insofar as the applied electric field exists. When the electric field is removed, the liquid crystal in the high polymer - liquid crystal compound membrane is brought into an isotropic phase, eliminating the orientation pattern. Therefore, the high polymer - liquid crystal compound membrane exhibits the property of the material (a).

Figure 5:
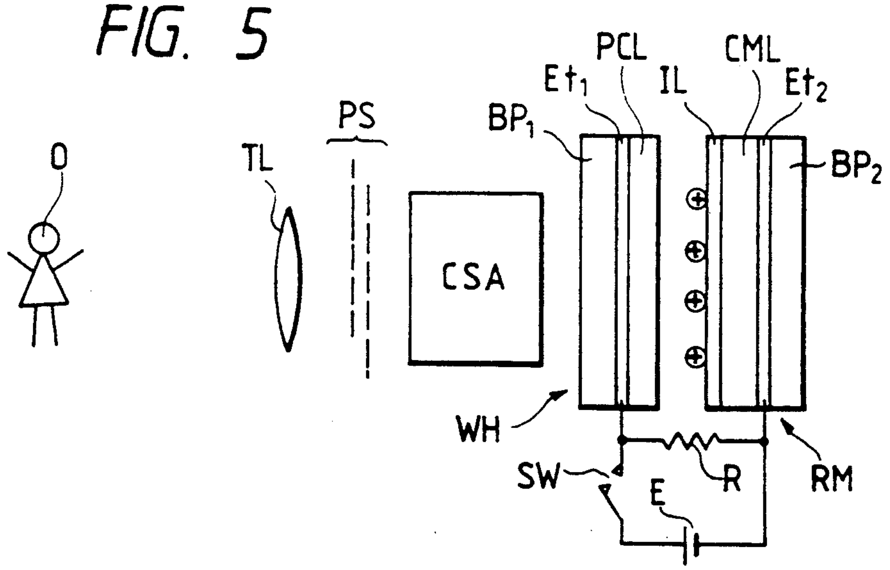

In the case where the high polymer - liquid crystal compound membrane exhibits the properties of the material (a), an insulation layer IL may be superposed on the recording layer CML as shown in FIG. 5. Since an electric field developed by an electric charge image stored in the insulation layer IL is applied to the recording layer CML over a long period of time, the high polymer - liquid crystal compound membrane of the recording layer CML functions as a memory operable by the combination of the insulation layer IL and the recording layer CML.

If the randomly located minute pores of a relatively small diameter, then the high polymer - liquid crystal compound membrane exhibits the property of the material (b).

In the case where the high polymer - liquid crystal compound membrane exhibits the properties of the material (b), when an electric field is applied to the high polymer - liquid crystal compound membrane which operates in a dispersion mode, an orientation pattern of the liquid crystal corresponding to an applied electric field that corresponds to an optical image is developed in the high polymer - liquid crystal compound membrane. The developed orientation pattern of the liquid crystal, which is sealed in the pours, remains stored in the high polymer - liquid crystal compound membrane even after the electric field is removed. Therefore, the high polymer - liquid crystal compound membrane functions as a memory by itself.

More specifically, the liquid crystal has molecules sealed in the minute pores of the high polymer - liquid crystal compound membrane. The sealed liquid crystal molecules are subject to forces from the surfaces of the walls of the minute pores. Since stronger forces are applied from the wall surfaces of the minute pores to those liquid crystal molecules which are positioned more closely to the wall surfaces, the liquid crystal molecules are subject to stronger forces from the wall surfaces as the diameter of the minute pores is smaller. When the liquid crystal molecules sealed in the minute pores are placed in an electric field whose intensity is higher than a certain threshold, the liquid crystal molecules are oriented in the direction of the electric field against the forces applied from the wall surfaces of the minute pores.

The degree to which the liquid crystal molecules are oriented under the applied electric field varies with the strength of the electric field. If the applied electric field is weaker, only those liquid crystal molecules which are subject to weaker forces from the wall surfaces, i.e., are positioned more closely to the center of the pores, are oriented in the direction of the electric field. As the strength of the applied electric field becomes stronger, those liquid crystal molecules which are subject to stronger forces from the wall surfaces, i.e., are positioned more closely to the wall surfaces, are also oriented in the direction of the electric field.

Therefore, when the molecules of the liquid crystal, e.g., of nematic or smectic phase, which are sealed in the small-diameter minute pores in the porous high polymer material of the high polymer - liquid crystal compound membrane are subjected to an electric field, the molecules are oriented in the direction of the electric field against the forces from the wall surfaces of the pores. Once the molecules are oriented under the applied electric field, they are then held in the oriented angular position under the forces from the wall surfaces. Therefore, even after the applied electric field is removed, the liquid crystal molecules remain oriented, thus memorizing the pattern in which they are oriented depending on the applied electric field.

The memorized orientation pattern, which corresponds to the optical information applied to the photoconductive layer PCL of the information recording medium RM, can be removed when the liquid crystal in the high polymer - liquid crystal compound membrane is melted into an isotropic phase by being heated to a temperature between the melting point of the liquid crystal and the melting point of the high polymer material. As time elapses thereafter, the melted liquid crystal is turned into a nematic or smectic phase, which is rendered opaque thereby removing the memorized orientation pattern.

To remove or erase any memorized molecular orientation from the recording layer CML in such a manner, the information recording medium RM may have a heating layer which may be supplied with electric energy to heat the recording layer CML for molecular orientation removal. Alternatively, memorized molecular orientation patterns may be erased from the recording layer CML by applying an intensive electric field to the recording layer CML.

In FIG. 5, the image write head WH and the information recording layer RM which includes the insulation layer IL are separate from each other, with the insulation layer IL facing the photoconductive layer PCL.

Figure 6:
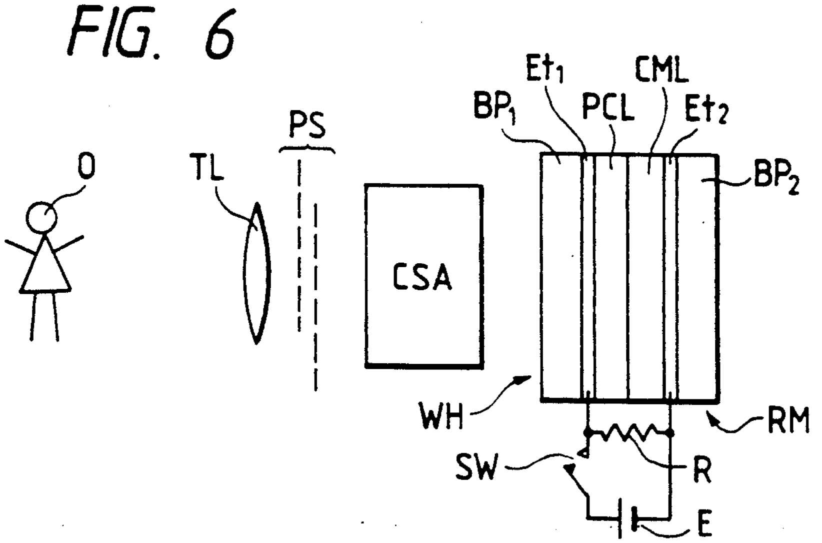

In FIG. 6, the image write head WH and the information recording layer RM as shown in FIG. 4 are combined together into an integral lamination structure, with the photoconductive layer PCL and the recording layer CML joined to each other.

In the recording systems shown in FIGS. 4 through 6, the recording layer CML of each of the information recording mediums RM may comprise a light modulating layer, as described before.

Figure 7:
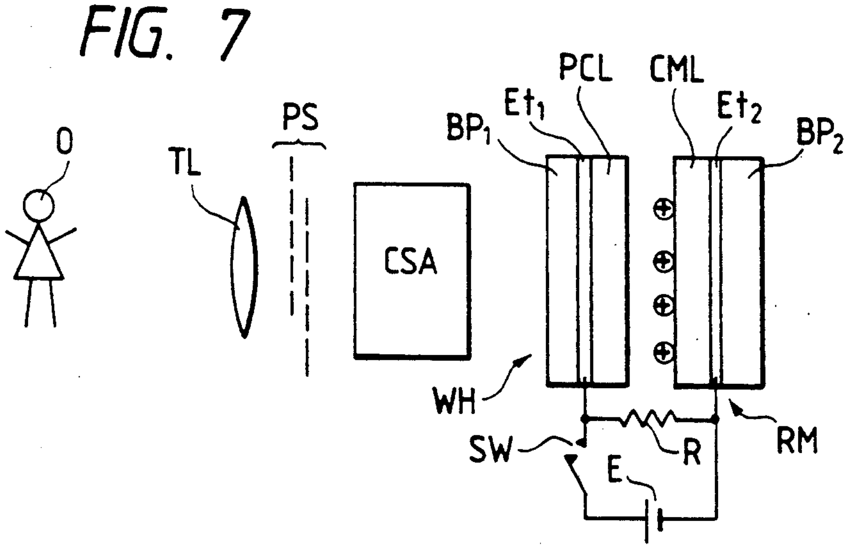

In FIG. 7, the image write head WH and the information recording layer RM as shown in FIG. 4 are separate from each other, with the photoconductive layer PCL and the recording layer CML spaced from each other. The recording layer CML of the information recording layer RM shown in FIG. 7 may comprise a charge storage layer, as described before.

While the information recording medium RM is shown as being in the form of a tape, it may be in the shape of a disc, a sheet, or any of various other configurations. The information recording medium RM may be fed or transported in various known manners.

In each of FIGS. 4 through 7, when the switch SW connected in series to the power supply E between the electrodes Et1, Et2 is turned on or closed, a predetermined electric field is developed between the electrodes Et1, Et2. Actually, the function of the switch SW is performed by the control unit CTL shown in FIG. 1.

The transparent substrate BP1 may be a glass substrate and the transparent electrode Et1 may be of ITO. They are of such spectral transmittance characteristics that they pass light in a wavelength band for optical images to be recorded.

The photoconductive layer PCL is made of a photoconductive material such as amorphous silicon which is capable of generating a high fine electric charge image on one surface when a highly fine optical image is focused on the other surface while an electric field of certain strength is being applied to the photoconductive layer PCL.

In each of the recording systems shown in FIGS. 4 through 7, when the optical shutter PSt is opened, the optical image of a subject O passes through the lens TL into the trichromatic color separator CSA by which the optical image is separated into three color images that are focused on the photoconductive layer PCL of the image write head WH through the transparent electrode Et1.

Then, the switch SW is turned on to apply a predetermined voltage from the power supply E between the electrodes Et1, Et2. The voltage is selected to either generate an electric field between the electrodes Et1, Et2 which is required to record optical information corresponding to the three color images on the recording layer CML, or to produce electric charge images on the recording layer CML. Therefore, optical information corresponding to the three color images on the photoconductive layer PCL is recorded on the recording layer CML.

More specifically, when the three color images generated by the trichromatic color separator CSA pass through the transparent electrode Et1 and are focused on the photoconductive layer PCL, the electric resistances of the areas of the photoconductive layer PCL where the three color images are focused vary depending on the intensities of light of the three color images, and hence correspond to the intensities of light from the subject O.

Depending on the varied electric resistances of the areas of the photoconductive layer PCL, different electric charges are developed in the surface of the photoconductive layer PCL remote from the transparent electrode Et1. Therefore, electric field whose strength depend on the electric charges (electric charge images) are developed and applied to the recording layer CML.

In FIG. 5, electric charge images are formed on the insulating layer IL due to electric discharges under the developed electric fields, the insulating layer IL being disposed on the light modulating layer as the recording layer CML. In FIG. 7, electric charges are formed on the charge storage layer as the recording layer CML due to electric discharges under the developed electric fields.

In the case where the recording layer CML comprises a light modulating layer as with the arrangements shown in FIGS. 4 through 6, an optical property of the recording layer CML, such as optical dispersion, birefringence, optical rotation, or the like, varies in response to the application of a voltage thereto, as described above, which voltage depends on the electric charges developed by the photoconductive layer PCL. The recording layer CML records the image information corresponding to the developed electric charges as changes in the optical property in a manner depending on the material (a) or the material (b), as described above, which the light modulating layer may be made of.

As shown in FIG. 4, the three color images are recorded on the information recording medium RM in respective adjacent spaced areas surrounded by rectangular frames indicated by R, G, B, respectively, with the guard bands interposed therebetween.

In FIGS. 5 and 7, the image write head WH and the information recording medium RM may be kept in spaced-apart relationship to each other by a spacer (not shown) disposed therebetween.

If the recording layer CML includes a material, such as liquid crystal, whose optical property progressively varies with time, then the electrode Et2 of the information recording medium RM may be divided into a plurality of separate sections each corresponding to one image unit which includes three color images that will eventually make up one image, and only the electrode section where image information is to be recorded may be supplied with a voltage.

Figure 2:
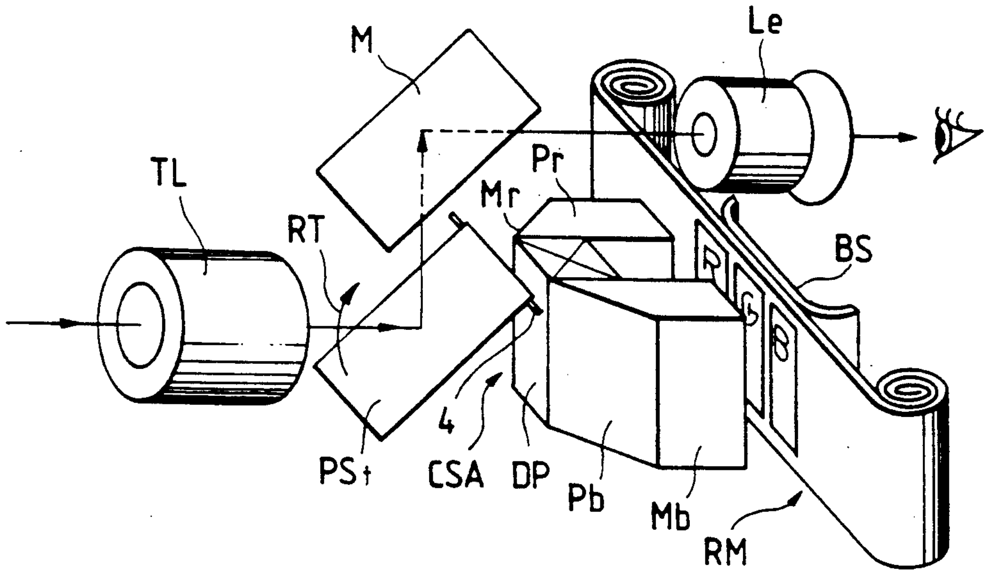

FIG. 2 shows a color imaging system according to another embodiment of the present invention. The color imaging system shown in FIG. 2 is particularly suitable if the information recording medium RM is opaque or the holder BS is opaque, or if the color imaging system has a casing which does not allow any viewfinder to be located behind the holder BS.

The color imaging system shown in FIG. 2 is essentially of the same construction as the color imaging system shown in FIG. 1 except that an optical shutter PSt behind the lens TL is in the form of a flap shutter angularly movable upwardly in the direction indicated by the arrow RT about a pivot shaft 4 when an optical image is to be recorded. When the optical shutter PSt swings into an upper horizontal position, it is opened and allows the optical image of a subject to pass from the lens TL to the trichromatic color separator CSA. Although not shown, the color imaging system also has the actuator Dpst, the operating unit OP, the control unit CTL, and the power supply E, as with the color imaging system shown in FIG. 1.

The color imaging system has a viewfinder eyepiece Le located above the holder BS. The optical shutter PSt has an upper mirror surface which, when the optical shutter PSt is in a closed position as shown in FIG. 2, reflects light from the subject upwardly toward a fully reflecting mirror M which in turn reflects the light toward the viewfinder eyepiece Le. The optical shutter PSt is angularly movable by the actuator PSt. The viewfinder including the eyepiece Le is arranged such that if the optical image as viewed through the eyepiece Le by the user is sharply focused, then the optical image will also be sharply focused on the photoconductive layer PCL when the optical shutter PSt is moved upwardly.

The color imaging system shown in FIG. 2 operates in the same manner as the color imaging system shown in FIG. 1.

In the color imaging systems shown in FIGS. 1 and 2, only image information representing the optical image of the subject O is recorded on the information recording medium RM. However, image information, also referred to as primary information, and audio information, also referred to as auxiliary information, may be recorded in different regions on the same information recording medium RM.

Figure 3:
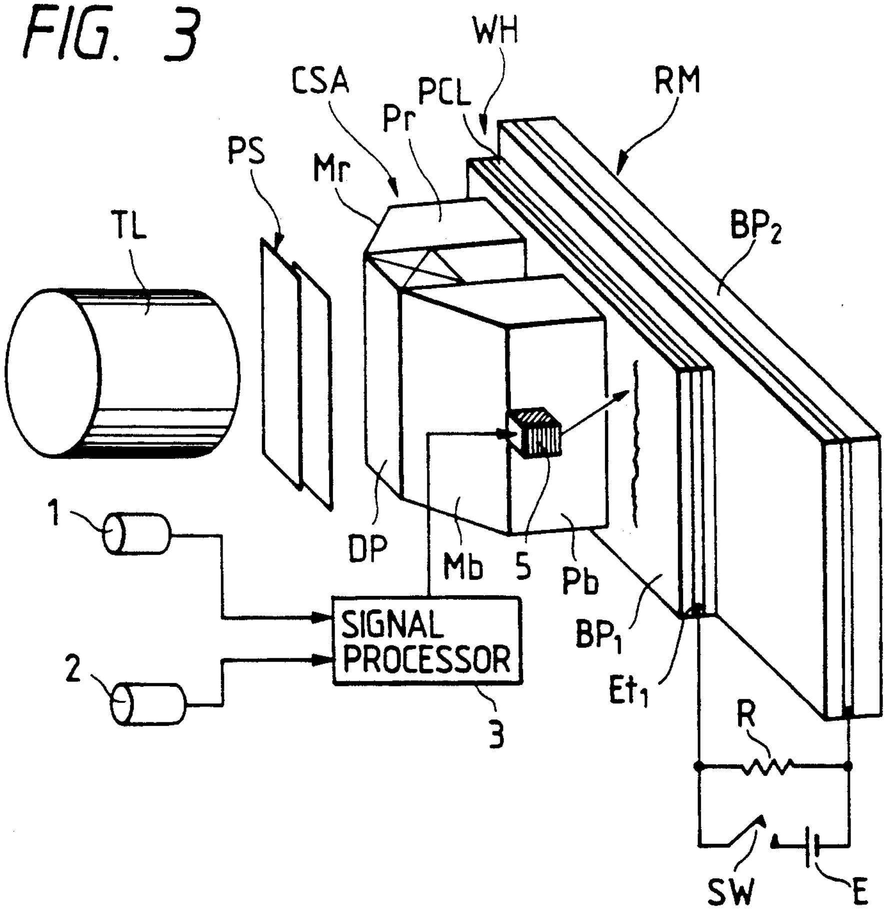

FIG. 3 shows a color imaging system capable of recording such primary and auxiliary information on the same information recording medium RM.

The color imaging system shown in FIG. 3 differs from the color imaging system shown in FIG. 1 in that it additionally has an audio information recording mechanism. Therefore, only the audio information recording mechanism will be described below. The audio information recording mechanism includes a pair of microphones 1, 2, an audio signal processor 3, and a light signal processor 5.

Two-channel electric signals representative of audio information to be recorded are generated by the respective microphones 1, 2, and amplified and suitably processed by the audio signal processor 3. Then, the amplified and processed signals are supplied to the light signal processor 5.

The light signal processor 5 comprises a light source for emitting two rays of light whose intensities are modulated by the respective signals from the audio signal processor 3, and a light deflector for deflecting the modulated rays of light from the light source and recording the deflected ray of light as audio information on the information recording medium RM in an audio information recording area thereon. The audio information may be recorded in one of the guard bands between the areas on the information recording medium RM where image information is recorded.

Figure 8:
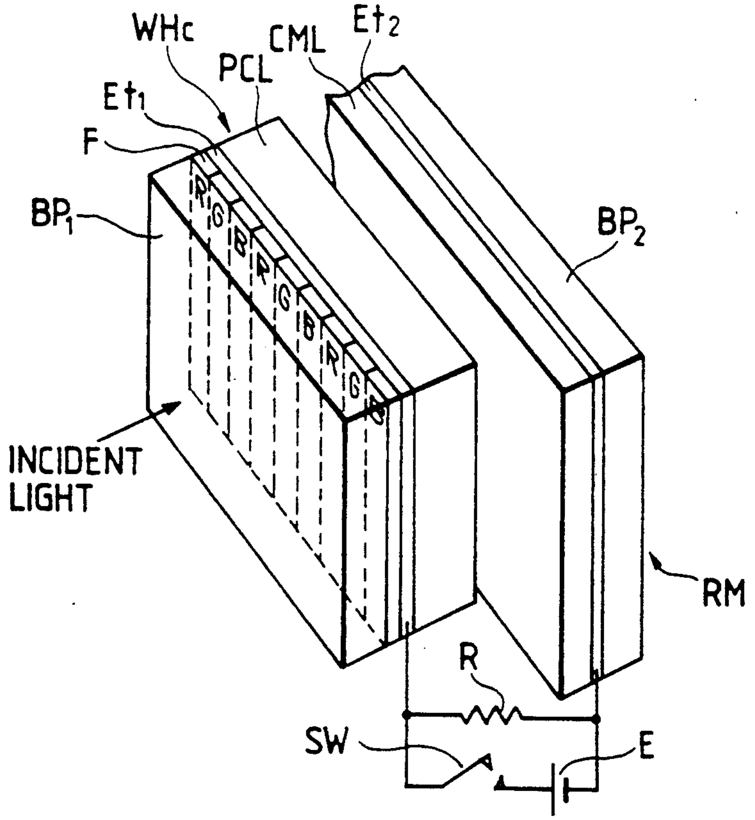

FIG. 8 shows a color imaging system according to a further embodiment of the present invention. The color imaging system does not employ a trichromatic color separator CSA as shown in FIGS. 1 through 3, but has an image write head WH which includes a striped color separation filter F disposed between the substrate BP1 and the electrode Et1.

Figure 9:
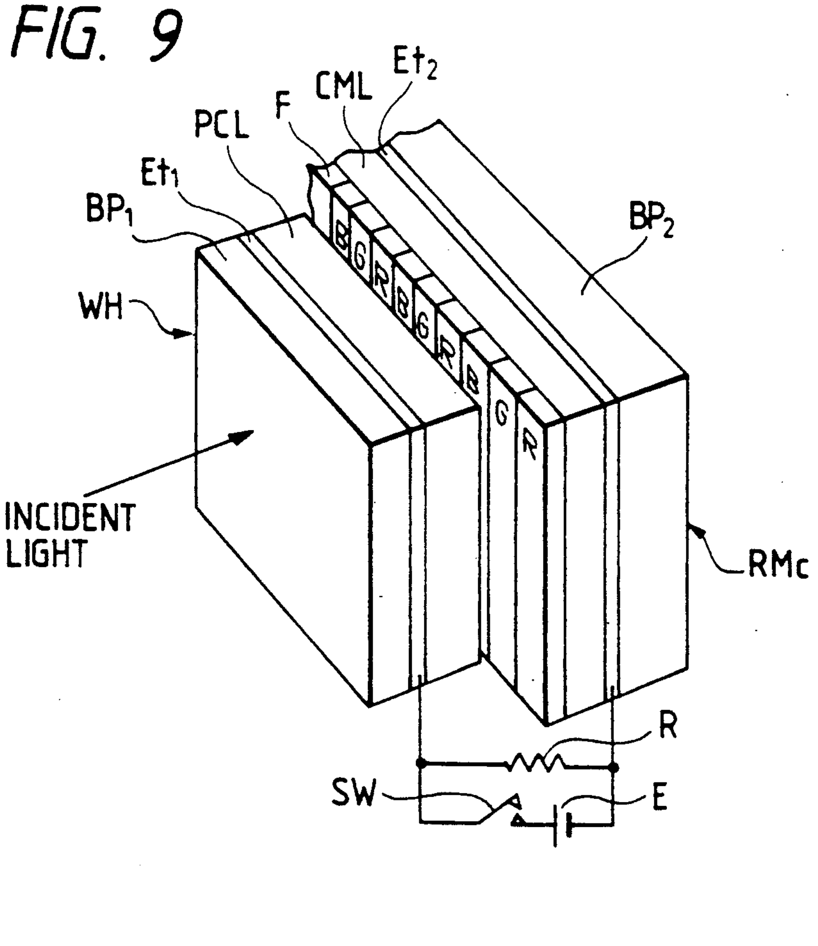

FIG. 9 shows a color imaging system according to a still further embodiment of the present invention. The color imaging system has an information recording medium RMc which includes a striped color separation filter F disposed on the recording layer CML.

Figure 10:
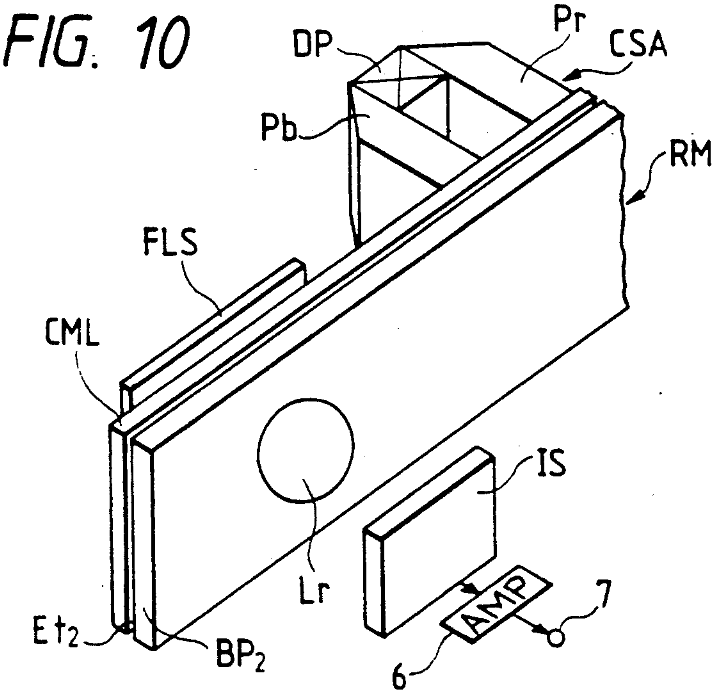
FIGS. 10 through 12 are perspective views, partly in block form, of color imaging systems according to other embodiments of the present invention.

A color imaging system according to another embodiment of the present invention is fragmentarily shown in FIG. 10. The color imaging system shown in FIG. 10 is essentially the same as the color imaging system according to any of the preceding embodiments, but additionally has a mechanism for reading information recorded on the information recording medium RM. The information reading mechanism includes a surface illuminant or light source FLS disposed in front of the information recording medium RM, a lens Lr disposed behind the information recording medium RM, a two-dimensional image sensor IS positioned behind the lens Lr, an amplifier 6 connected to the two-dimensional image sensor IS, and an output terminal 7 connected to the amplifier 6. The surface light source FLS may comprise an electroluminescent lamp.

Reading light emitted by the surface light source FLS is applied to an information recorded area of the information recording medium RM. The light which has passed through the information recording medium RM is converted into an electric signal by the two-dimensional image sensor IS. The electric signal is then amplified by the amplifier 6 and sent to the output terminal 7 for supply to an external circuit (not shown).

Figure 11A:
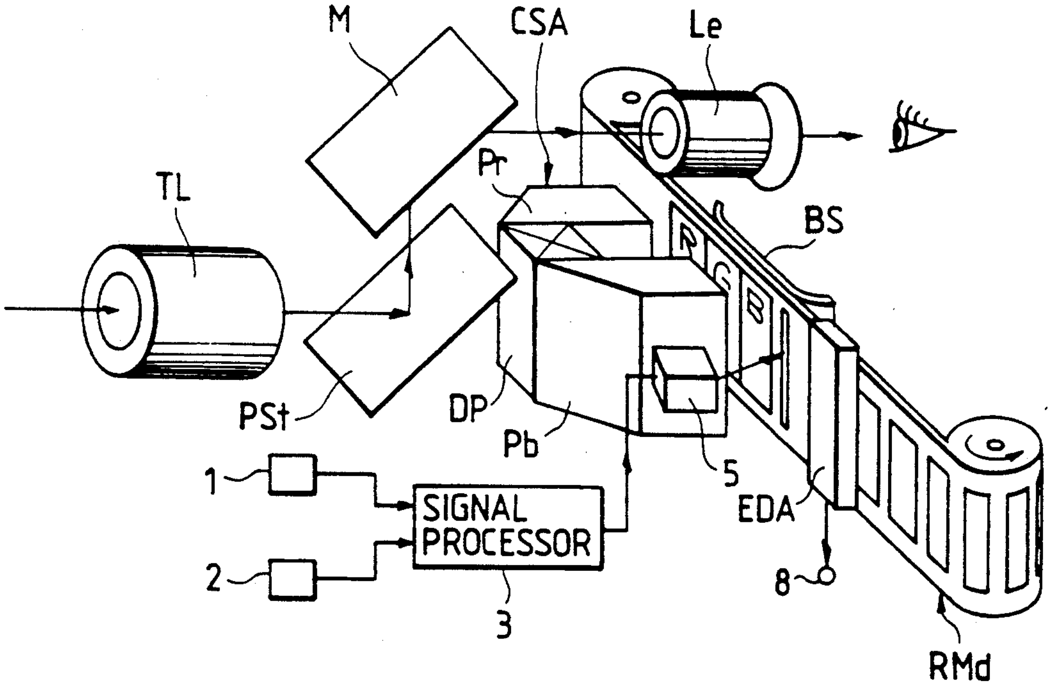

FIG. 11A shows another color imaging system with an information reading mechanism. The color imaging system shown in FIG. 11A is basically the same as the color imaging system shown in FIG. 3, but employs an information recording medium RMd that is of the same type as the integrally joined combination of the information recording medium RM and the image write head WH shown in FIG. 6. The information reading mechanism comprises an electrode array EDA vertically disposed in front of and across the information recording medium RMd, and an output terminal 8 connected to the electrode array EDA.

Figure 11B:
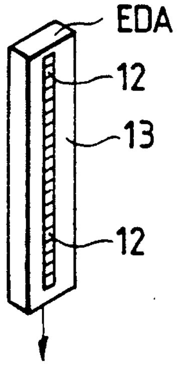

As shown in FIG. 11B, the electrode array EDA comprises a multiplicity of small electrodes 12 each of a very small diameter which are supported on a vertically elongate base 13.

Information recorded on the information recording medium RMd of the color imaging system shown in FIGS. 11A and 11B is read as follows: Electric charges developed and recorded as information in the information recording medium RMd are electrostatically detected as voltages by the respective electrodes 12 of the electrode array EDA. The recorded information is successively read from the information recording medium RMd when the information recording medium RMd is continuously moved across the electrode array EDA. The detected voltages are sent as successive electric time-series signals from a scanning circuit (not shown) to the output terminal 8. For details about the detection of electric charge images by the electrode array, reference should be made to Japanese Laid-Open Patent Publication No. 2-35639.

Figure 12:
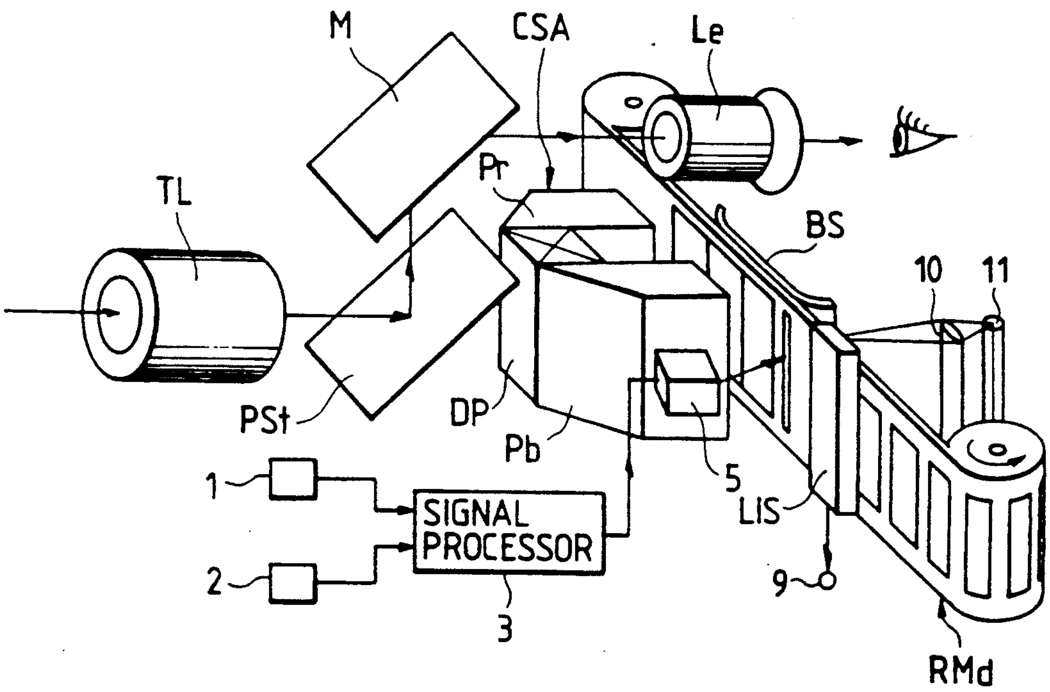

FIG. 12 shows still another color imaging system with an information reading mechanism. The color imaging system shown in FIG. 12 is basically the same as the color imaging system shown in FIG. 11A. The information reading mechanism includes a cylindrical lens 10 disposed vertically behind the information recording medium RMd, a linear light source 11 disposed behind the cylindrical lens 10, a line image sensor LIS disposed in front of and extending across the information recording medium RMd, and an output terminal 9 connected to the line image sensor LIS. Light emitted by the linear light source 11 is applied through the cylindrical lens 10 to an information recorded area of the information recording medium RMd. The light which has passed through the information recording medium RMd is applied to the line image sensor LIS which is linearly scanned by a scanning circuit (not shown). When the information recording medium RMd is continuously fed across the line image sensor LIS, successive electric time-series signals representative of recorded information are delivered from the line image sensor LIS to the output terminal 9.

Figure 13:
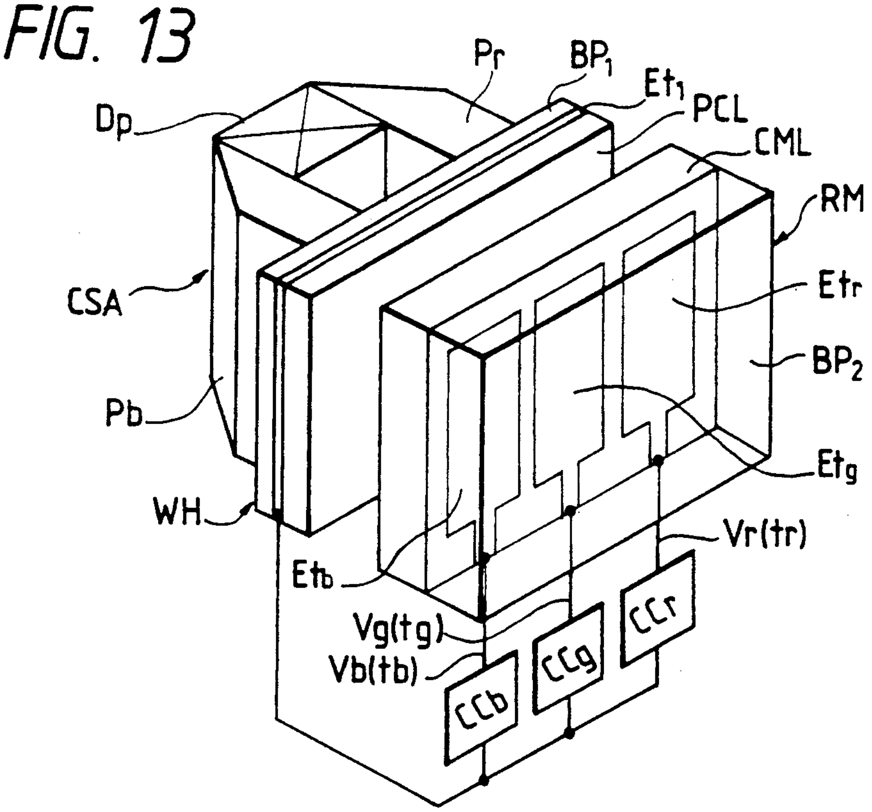
FIGS. 13 through 17 are views of color imaging systems according to other embodiments of the present invention.

FIG. 13 shows a color imaging system according to another embodiment of the present invention. The color imaging system shown in FIG. 13 is basically the same as the color imaging system shown in FIG. 7 except that the information recording medium RM includes three electrodes Etr, Etg, Etb sandwiched between the recording layer CML and the substrate BP2. The electrodes Etr, Etg, Etb are positioned behind respective juxtaposed areas of the recording layer CML which correspond in position to the respective optical images produced by the trichromatic color separator CSA. The electrodes Etr, Etg, Etb are connected to respective control units or circuits CCr, CCg, CCb which are connected to the electrode Et1 of the image write head WH. The control units CCr, CCg, CCb serve to apply respective voltages vr, vg, vb between the electrode Et1 and the respective electrodes Etr, Etg, Etb for respective periods tr, tg, tb of time.

The voltages vr, vg, vb applied by the control units CCr, CCg, CCb and the periods tr, tg, tb of time for which the voltages vr, vg, vb are applied are determined depending on the spectral sensitivity characteristics of the photoconductive layer PCL for wavelength bands of the red, green, and blue images produced by the trichromatic color separator CSA. More specifically, the voltages vr, vg, vb and the periods tr, tg, tb of time are selected to equalize electric charges which are applied to the juxtaposed areas of the recording layer CML due to reductions in the electric resistance of the photoconductive layer PCL in the areas thereof where red, green, and blue images produced from the equi-energy white image of a subject by the trichromatic color separator CSA are applied. Since the voltages vr, vg, vb and the periods tr, tg, tb of time can independently be controlled by the control units CCr, CCg, CCb, any contrast variations of the red, green, and blue images due to different spectral sensitivities of the photoconductive layer PCL with respect to the different wavelength bands can appropriately be compensated for.

Figure 14:
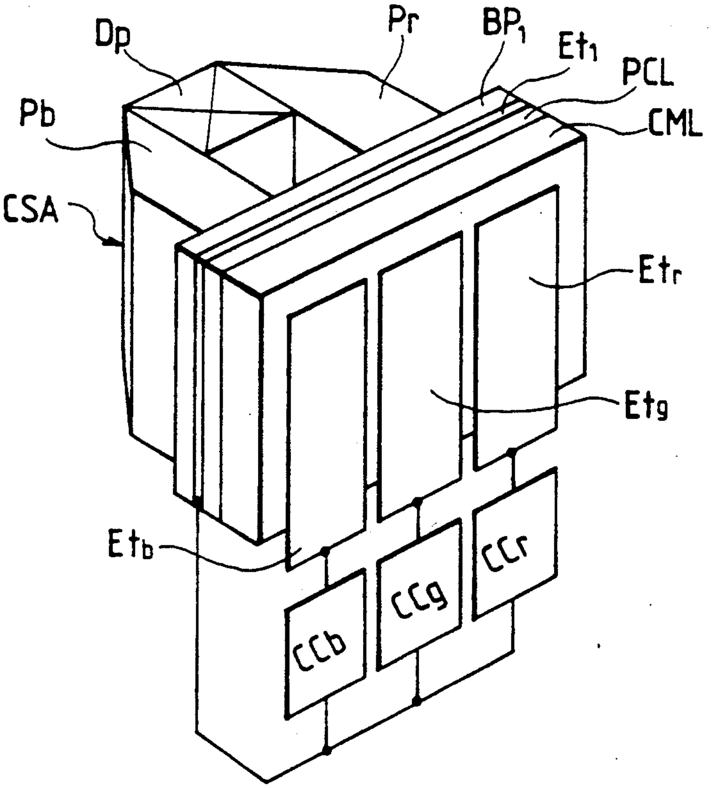

FIG. 14 shows a color imaging system according to still another embodiment of the present invention. The color imaging system shown in FIG. 14 differs from the color imaging system shown in FIG. 13 in that the photoconductive layer PCL and the recording layer CML are joined to each other and no substrate is positioned behind the electrodes Etr, Etg, Etb.

Figure 15:
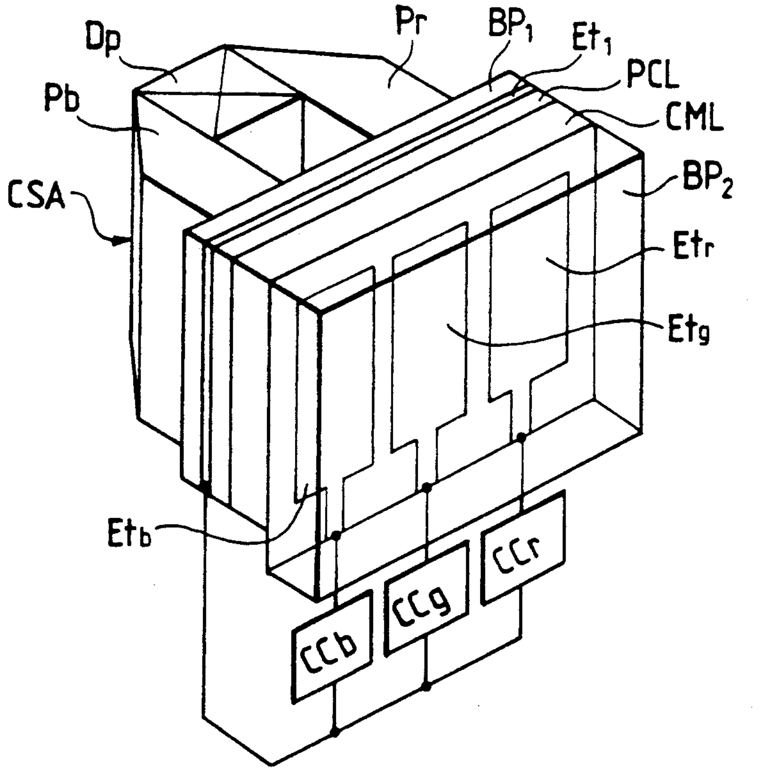

FIG. 15 illustrates a color imaging system according to yet another embodiment of the present invention. The color imaging system shown in FIG. 15 differs from the color imaging system shown in FIG. 13 in that the photoconductive layer PCL and the recording layer CML are joined to each other.

Figure 16:
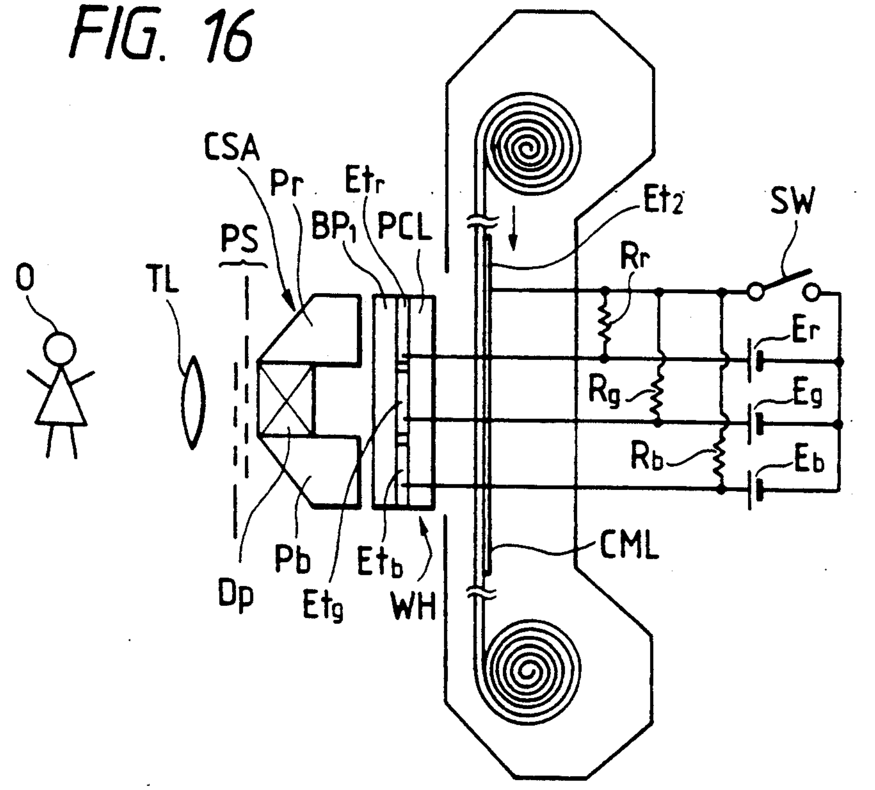

According to a further embodiment shown in FIG. 16, the image write head WH includes three electrodes Etr, Etg, Etb sandwiched between the photoconductive layer PCL and the substrate BP1. The recording layer CML is in the form of a tape, and is slidably held against the electrode Et2 positioned behind the recording layer CML. The recording layer CML is positioned in spaced-apart relationship to the photoconductive layer PCL. The electrodes Etr, Etg, Etb are connected to respective power supplies Er, Eg, Eb which are connected to the electrode Et2 through a switch SW. The electrode Et2 is also connected to the power supplies Er, Eg, Eb through respective resistors Rr, Rg, Rb. The recording layer CML is wound on a supply reel and a takeup reel, and is fed a distance corresponding to one image frame each time a color image is recorded on the recording layer CML. Preferably, the recording layer CML in the form of a tape should be made of a light modulating layer, as described above, to keep recorded information stored safely even when it is wound on the takeup reel.

Figure 17:
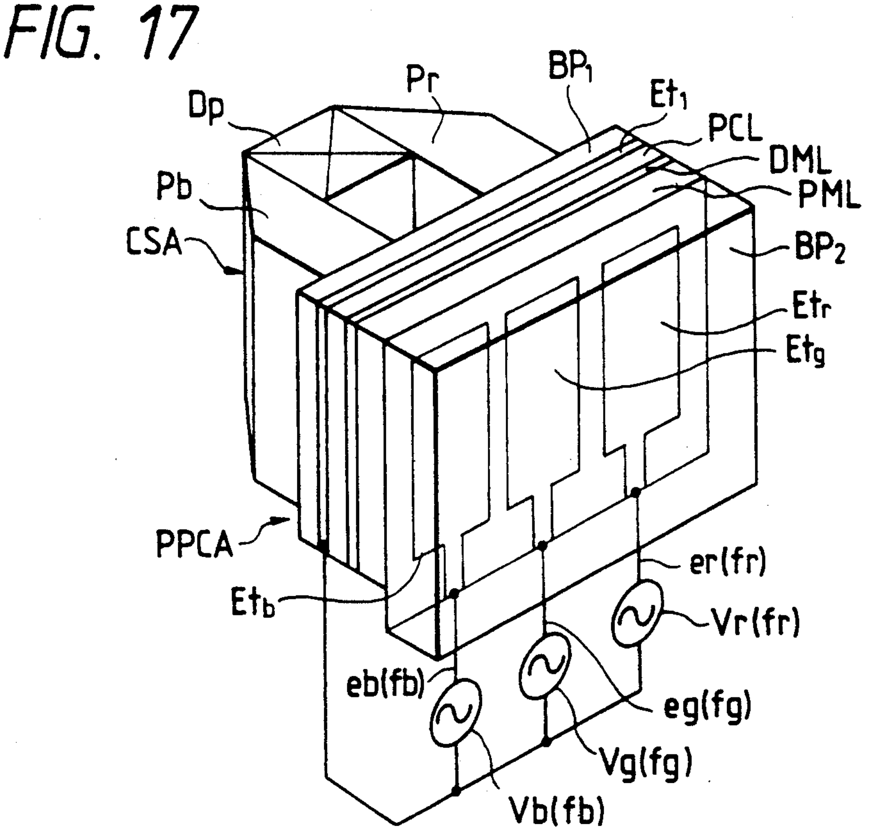

FIG. 17 shows a color imaging system according to a still further embodiment of the present invention. The color imaging system shown in FIG. 17 includes a reflective light-to-light converter assembly PPCA positioned behind a trichromatic color separator CSA.

The reflective light-to-light converter assembly PPCA comprises a transparent substrate BP1 as of glass, a transparent electrode Et1, and a photoconductive layer PCL, which are of the same structure as the image write head WH in the color imaging systems according to the previous embodiment. The reflective light-to-light converter assembly PPCA also includes a dielectric mirror DML, a light modulating layer PML, three juxtaposed electrodes Etr, Etg, Etb, and a substrate BP2, which are of a laminated structure and joined to the photoconductive layer PCL. The electrodes Etr, Etg, Etb are connected to respective AC power supplies Vr, Vg, Vb which serve as control units and are connected to the electrode Et1.

Figure 18:
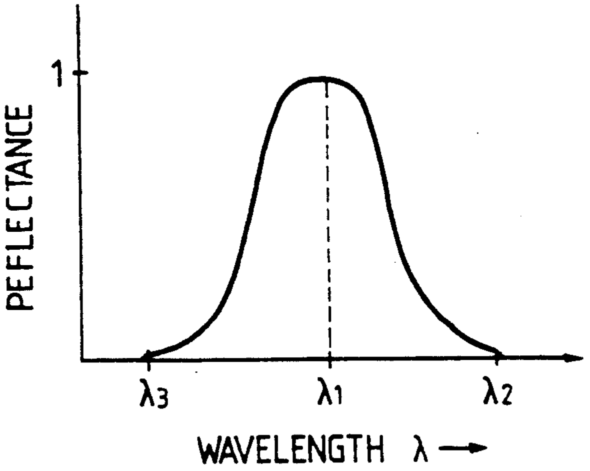
FIG. 18 is a diagram showing the reflectance vs wavelength curve of a dielectric mirror.

The light modulating layer PML is identical in construction and material to the recording layer CML which is composed of a light modulating layer in the previous embodiments. The dielectric mirror DML comprises a multilayer film of $SiO_2/TiO_2$ and has a reflectance vs wavelength curve, as shown in FIG. 18, such that it has a larger reflectance with respect to a certain wavelength of light falling thereon.

Figure 19:
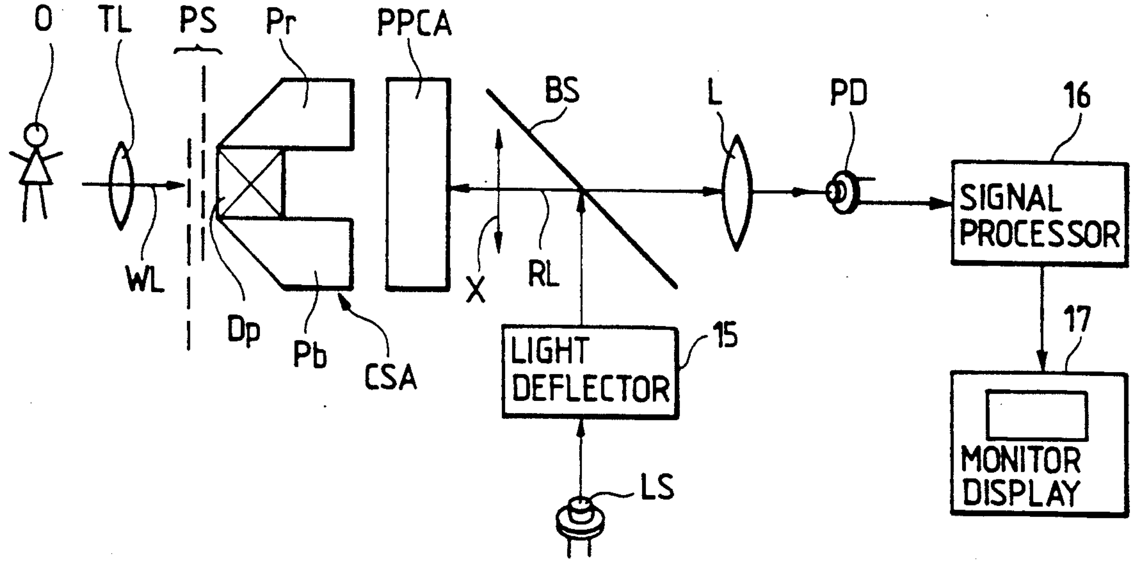
FIG. 19 is a schematic view showing the manner in which the color imaging system shown in FIG. 17 operates.

Operation of the color imaging system shown in FIG. 17 will be described below with reference to FIG. 19. In FIG. 19, the color imaging system includes a lens TL for focusing the optical image (writing light WL) of a subject O, an optical shutter PS for selectively introducing the optical image of the subject O into the trichromatic color separator CSA, a beam splitter BS, a light source LS for emitting reading light RL, a light deflector 15, a lens L, a photodetector PD, a signal processor 16, and an image display monitor 17.

When the optical shutter PS is open, the optical image or writing light WL from the subject O is applied through the lens TL and the optical shutter PS to the trichromatic color separator CSA. The writing light WL is processed processed by the trichromatic color separator CSA into three color images, i.e., green, red, and blue images, which are then focused on the photoconductive layer PCL. Between the electrode Et1 and the electrodes Etr, Etg, Etb, there are applied AC voltages by the AC power supplies Vr, vg, Vb, the AC voltages having values or frequencies selected depending on the spectral sensitivities of the photoconductive layer PCL to the wavelength bands of the red, green, and blue images produced by the trichromatic color separator CSA.

The electric resistances of the areas of the photoconductive layer PCL where the red, green, and blue images are focused vary depending on the intensities of writing light WL in those areas, and electric charge images corresponding to the respective red, green, and blue images are developed in the boundary between the photoconductive layer PCL and the dielectric mirror DML.

Electric fields depending on the electric charge images thus developed are then applied to the light modulating layer PML. Now, reading light RL emitted from the light source LS and deflected by the light deflector 15 is reflected by the beam splitter BS and applied through the substrate BP2 and the light modulating layer PML to the dielectric mirror DML. The reading light RL is deflected by the light deflector 15 so that it scans the light-to-light converter assembly PPCA in a main scanning direction indicated by the arrow X while the light-to-light converter assembly PPCA is scanned in an auxiliary scanning direction normal to the main scanning direction X. The reading light RL is then reflected by the dielectric mirror DML and passes again the light modulating layer PML and the substrate BP2. While the reading light RL is passing through the light modulating layer PML to which the electric fields are being applied, the reading light RL is varied in its state depending on the intensities of the electric charge images.

If the light modulating layer PML is of a material which modifies the rotation of a plane of polarization of light that passes therethrough, then the rotation of the plane of polarization of the reading light RL is modified depending on the intensities of the electric charge images. If the light modulating layer PML is of a material which modifies the dispersion of light that passes therethrough, then the dispersion of the reading light RL is modified depending on the intensities of the electric charge images. At any rate, the reading light RL which has passed through the light modulating layer PML and left the substrate BP2 is representative of information of the electric charge images.

The reading light RL from the light-to-light converter assembly PPCA passes through the beam splitter BS and is focused by the lens L onto the photodetector PD by which it is converted into an electric signal. If the plane of polarization of the reading light RL is modified by the light modulating layer PML, then the reading light RL is passed through an analyzer before it is converted into an electric signal. The electric signal produced by the photodetector PD is then processed by the signal processor 16 and supplied to the image display monitor 17, for example, for display.

The reading light RL is of a wavelength λ1 (FIG. 18) such that it is reflected by the dielectric mirror DML with the maximum reflectance. The writing light WL may be of a wavelength λ2 or λ3 with respect to which the dielectric mirror DML has a lower reflectance.

In the operation, AC voltages er, eg, eb of predetermined frequencies fr, fg, fb are applied between the electrode Et1 and the respective electrodes Etr, Etg, Etb by the AC power supplies Vr, Vg, Vb, respectively. The AC voltages er, eg, eb and/or the frequencies fr, fg, fb are determined depending on the spectral sensitivity characteristics of the photoconductive layer PCL for wavelength bands of the red, green, and blue images produced by the trichromatic color separator CSA. More specifically, the voltages er, eg, eb are selected to equalize electric charges which are applied to the juxtaposed areas of the light modulating layer PML due to reductions in the electric resistance of the photoconductive layer PCL in the areas thereof where red, green, and blue images produced from the equi-energy white image of a subject by the trichromatic color separator CSA are applied. Alternatively, the frequencies fr, fg, fb may be determined to equalize the electric charges while the values of the voltages er, eg, eb are kept constant.

Figure 20:
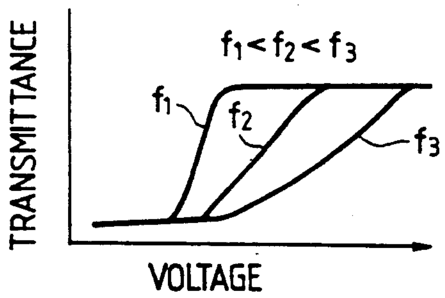
FIG. 20 is a diagram showing the relationship between the transmittance of a light modulating layer and the voltage applied thereto with respect to different frequencies of the voltage.

More specifically, FIG. 20 shows the relationship between the transmittance of the light modulating layer PML and the voltage applied thereto when the light modulating layer PML is composed of a liquid crystal material which is capable of dispersing light under an electric field applied. The transmittance varies with the voltage along different curves depending on the frequency of the voltage. For example, when voltages having frequencies f1, f2, f3 (f1<f2<f3) are applied to the light modulating layer PML, the transmittance thereof varies along respective curves f1, f2, f3 as shown in FIG. 20. Therefore, even if the applied voltage has a constant value, the transmittance of the light modulating layer PML varies when the frequency of the voltage varies.

Consequently, even when the electric charges applied to the the juxtaposed areas of the light modulating layer PML due to reductions in the electric resistance of the photoconductive layer PCL in the corresponding areas are different from each other because of different spectral sensitivities of the photoconductive layer PCL with respect to different wavelengths, different intensities of the reading light RL which are caused by the different electric charges can be equalized by varying the transmittances of the areas of the light modulating layer PML through the individual control of the frequencies fr, fg, fb of the AC voltages er, eg, eb applied to those areas. As a consequence, the image displayed on the image display monitor 17 is free from a problem which would otherwise occur due to contrast variations of the red, green, and blue images in the different wavelength bands.

Figure 21:
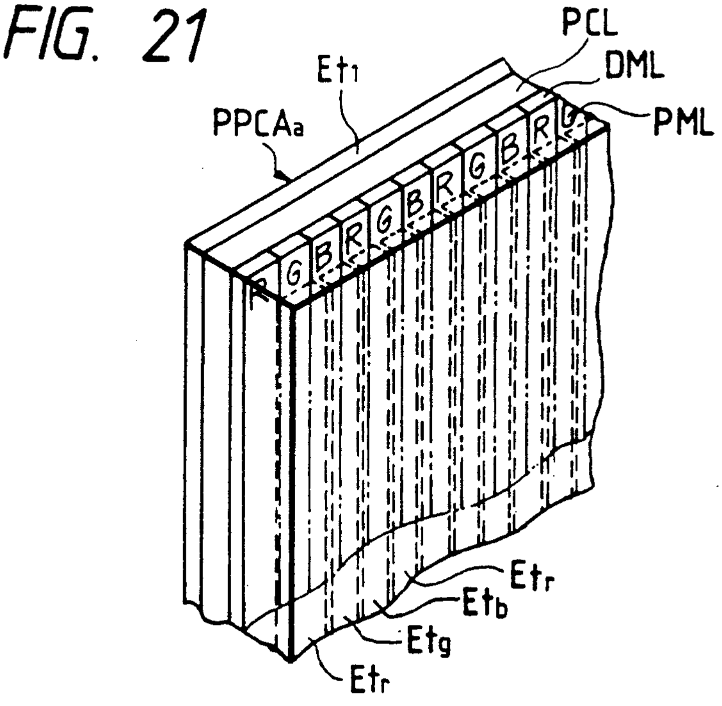
FIGS. 21 through 28 show modified light-to-light converter assemblies.

FIG. 21 fragmentarily shows a modified light-to-light converter assembly PPCAa which additionally includes a color separation filter positioned between the dielectric mirror DML and the light modulating layer PML, the color separation filter comprising an array of alternate thin vertical red, green, and blue strips. An array of alternate thin vertica electrodes Etr, Etg, Etb are also disposed on the light modulating layer PML in alignment with the respective filter strips. The electrodes Etr, Etg, Etb are connected respectively to the power supplies Vr, Vg, Vb as shown in FIG. 17.

Figure 22:
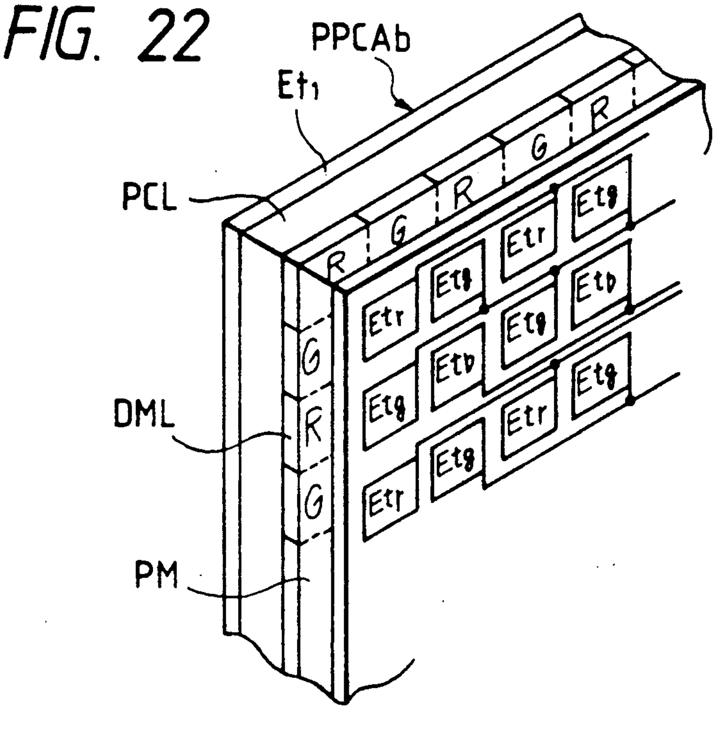

FIG. 22 fragmentarily shows another modified light-to-light converter assembly PPCAb which additionally includes a color separation filter positioned between the dielectric mirror DML and the light modulating layer PML, the color separation filter comprising a matrix of alternate small red, green, and blue dots. A matrix of alternate small dot-like electrodes Etr, Etg, Etb are also disposed on the light modulating layer PML in alignment with the respective filter dots. The electrodes Etr, Etg, Etb are connected respectively to the power supplies Vr, Vg, Vb as shown in FIG. 17.

Figure 23:
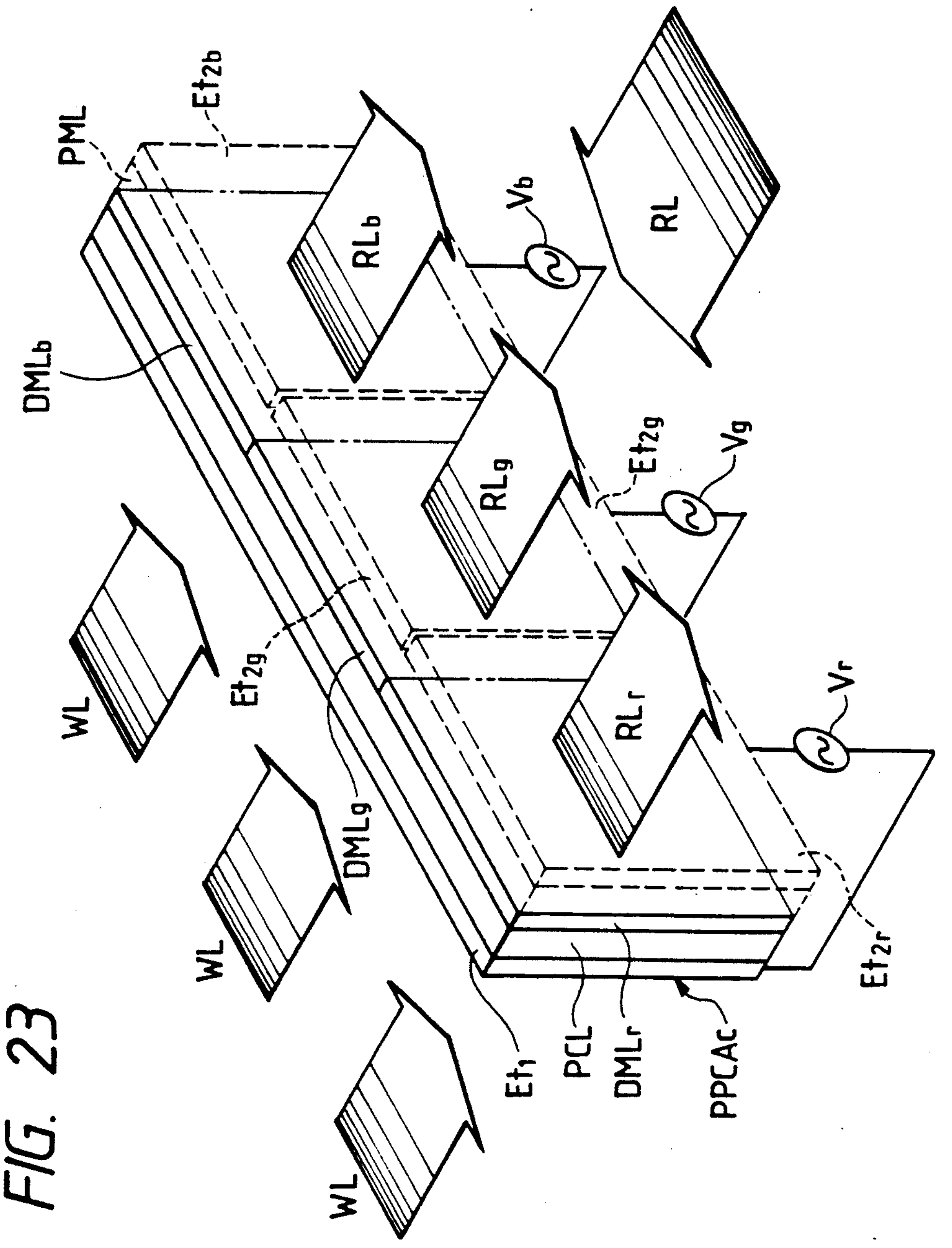

FIG. 23 also shows a modified light-to-light converter assembly PPCAc. The light-to-light converter assembly PPCAc differs from the light-to-light converter assembly PPCA shown in FIG. 17 in that there are employed three juxtaposed dielectric mirrors DMLr, DMLg, DMLb having higher reflectances with respect to reading light RLr, RLg, RLb in different wavelength bands applied respectively thereto. The light-to-light converter assembly PPCAc has three electrodes Et2r, Et2g, Et2b held against the light modulating layer PML in alignment with the respective dielectric mirrors DMLr, DMLg, DMLb.

Figure 24:
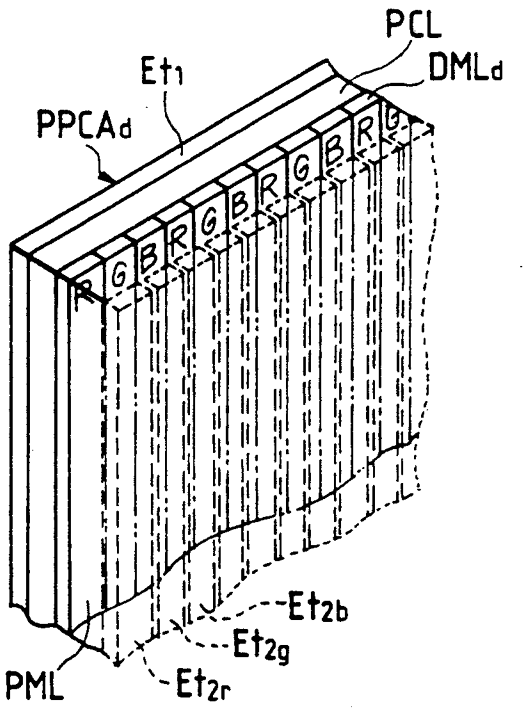

FIG. 24 fragmentarily shows a further modified light-to-light converter assembly PPCAd which has an array of alternate thin vertical dielectric mirrors DMLd. An array of alternate thin vertical electrodes Et2r, Et2g, Et2b are also disposed on the light modulating layer PML in alignment with the respective dielectric mirrors DMLd. The electrodes Et2r, Et2g, Et2b are connected respectively to the power supplies Vr, Vg, Vb as shown in FIG. 23.

Figure 25:
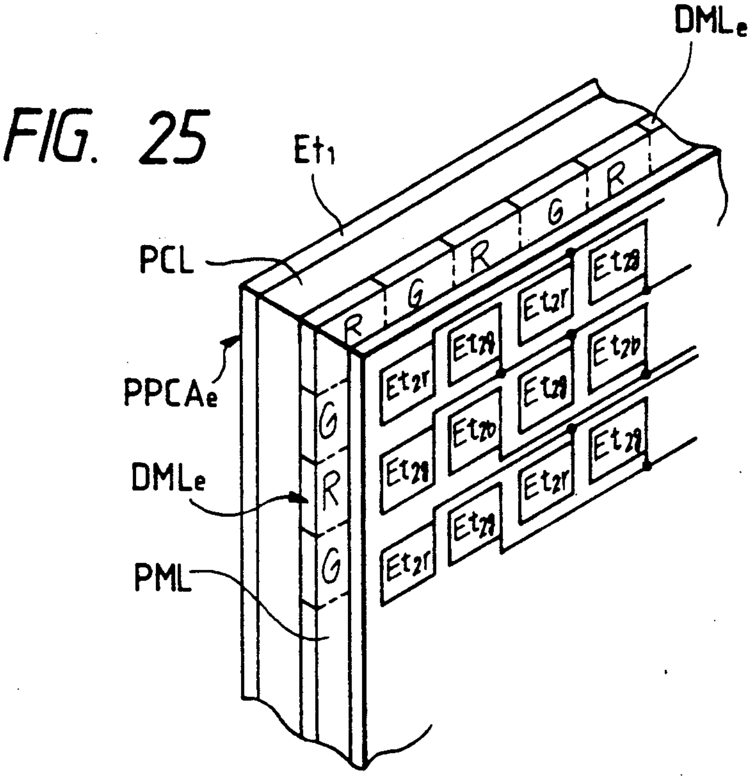

FIG. 25 fragmentarily shows a modified light-to-light converter assembly PPCAe which has a matrix of alternate small dot-like dielectric mirrors DMLd. A matrix of alternate small dot-like electrodes Et2r, Et2g, Et2b are also disposed on the light modulating layer PML in alignment with the respective dielectric mirrors DMLd. The electrodes Et2r, Et2g, Et2b are connected respectively to the power supplies Vr, Vg, Vb as shown in FIG. 13.

Figure 26:
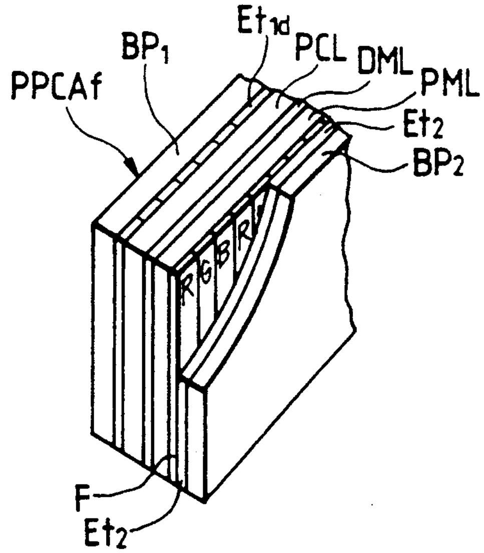

FIG. 26 fragmentarily shows another modified light-to-light converter assembly PPCAf which includes a striped color separation filter F composed of an array of thin vertical red, green, and blue strips and disposed between the light modulating layer PML and the electrode Et2. The light to-light converter assembly PPCAf also has an array of thin vertical electrodes Et1d aligned with the respective filter strips and disposed between the substrate BP1 and the photoconductive layer PCL.

Figure 27:
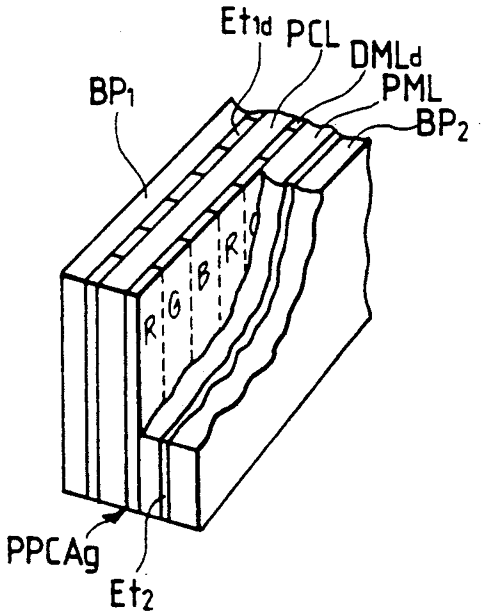

FIG. 27 fragmentarily shows a yet modified light-to-light converter assembly PPCAg which has an array of alternate thin vertical dielectric mirrors DMLd, and an array of thin vertical electrodes Et1d aligned with the respective dielectric mirrors DMLd.

Figure 28:
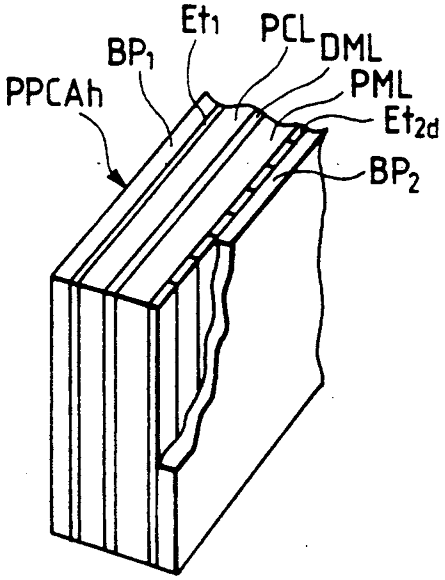

FIG. 28 fragmentarily shows another modified light-to-light converter assembly PPCAh which includes an array of alternate thin vertical electrodes Et2d which are disposed between the light modulating layer PML and the substrate BP2.

Figure 29:
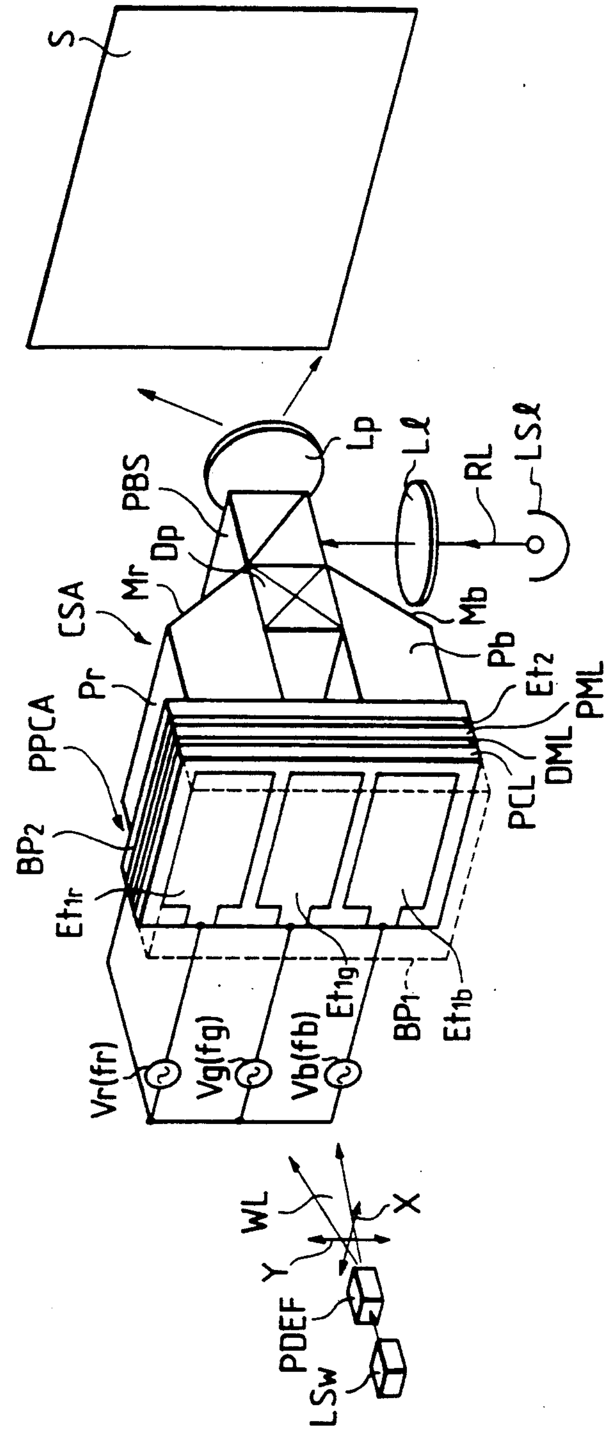
FIG. 29 is a perspective view of a display system employing a light-to-light converter assembly and a trichromatic color separator.

FIG. 29 shows a display system for displaying a recorded image on a screen S. The display system employs the light-to-light converter assembly PPCA and the trichromatic color separator CSA, the trichromatic color separator CSA being disposed on or in front of the substrate BP2. Electrodes Et1r, Et1g, Et1b connected to the respective AC power supplies Vr, Vg, Vb are disposed between the substrate BP1 and the photoconductive layer PCL.

The light-to-light converter assembly PPCA and the trichromatic color separator CSA operate in substantially the same manner as those shown in FIG. 17.

Write light WL representative of an optical image is emitted by a light source LSw and deflected by a light deflector PDEF in perpendicular directions indicated by the arrows X, Y. The deflected write light WL is applied to the light-to-light converter assembly PPCA develops electric charge images in the boundary between the photoelectric layer PCL and the dielectric mirror DML.

Read light RM is emitted by a light source LS1 and passes through a lens L1 into a polarizer beam splitter PBS. An S-polarized component of the read light RM is reflected by the polarizer beam splitter PBS into the trichromatic color separator CSA. The trichromatic color separator CSA divides the S-polarized read light RL into red, green, and blue S-polarized components, which pass through the substrate BP2, the electrode Et2, and the light modulating layer PML to the dielectric mirror DML. Then, the red, green, and blue S-polarized components are reflected by the dielectric mirror DML and travel back through the light modulating layer PML, the electrode Et2, and the substrate BP2.

While the red, green, and blue S-polarized components pass through the light modulating layer PML, their planes of polarization are varied depending on the electric fields that are applied to the light modulating layer PML due to the electric charge images.

The red, green, and blue S-polarized components are then combined by the trichromatic color separator CSA into light whose P-polarized component is emitted from the polarizer beam splitter PBS to a projection lens Lp. The P-polarized component is projected as a color image onto the screen S.

Figure 30:
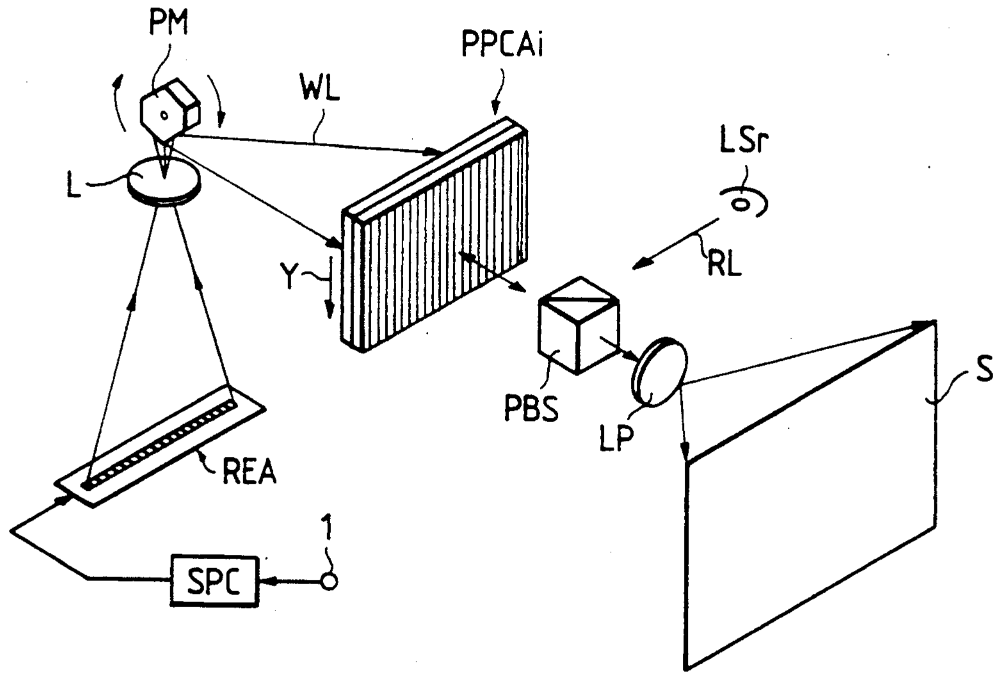
FIG. 30 is a perspective view of another display system which employs a light to-light converter assembly incorporating a color separation filter.
Figure 31:
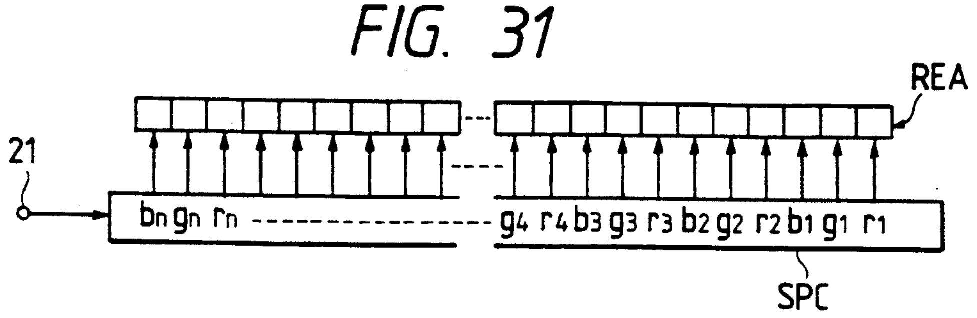
FIGS. 31 and 32 are diagrams showing the manner in which pixel signals are supplied to light-emitting arrays.

FIG. 30 shows another display system which employs a light-to-light converter assembly PPCAi incorporating a color separation filter, such as the light-to-light converter assembly PPCAa shown in FIG. 21. The display system shown in FIG. 30 includes a series-to-parallel converter SPC for converting a time-series color image signal supplied from an input terminal 21 into simultaneous or parallel 3N pixel signals for one scanning line as shown in FIG. 31. The series-to-parallel converter SPC may comprise a shift register.

The 3N pixel signals are supplied to an light-emitting array REA of 3N light-emitting elements divided into three groups, each composed of N light-emitting elements corresponding to one color. The light-emitting array REA emits an array of rays of write light WL corresponding to one scanning line and modulated by the respective 3N pixel signals. The emitted write light WL passes through a lens L and is deflected by a rotating polygonal mirror PM to scan the light-to-light converter assembly PPCAi in a direction indicated by the arrow Y. Therefore, a linear array of 3N light dots is applied to and recorded in the light-to-light converter assembly PPCAi.

Figure 32:
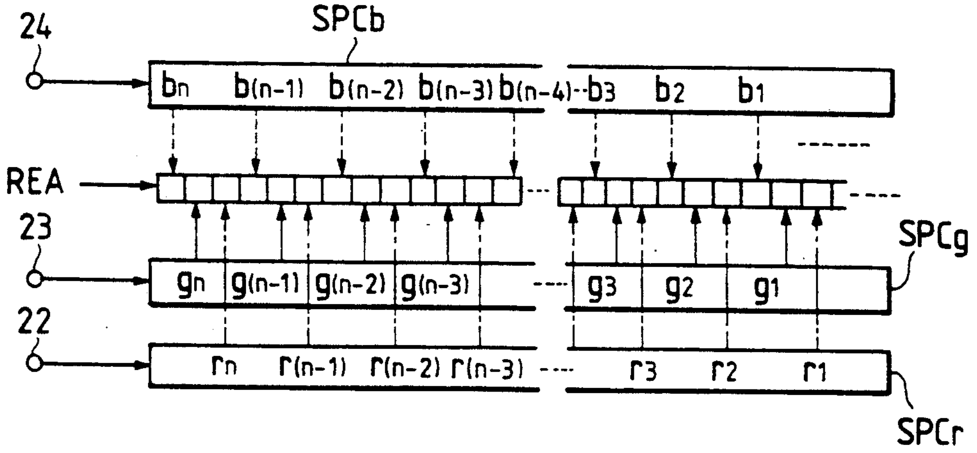

Simultaneous or parallel red, green, and blue pixel signals may be supplied from respective series-to-parallel converters. FIG. 32 shows the manner in which simultaneous pixel signals are supplied from respective series-to-parallel converters SPCr, SPCg, SPCb to the light-emitting array REA. The series-to-parallel converters SPCr, SPCg, SPCr are supplied with respective time-series red, green, and blue image signals from respective input terminals 22, 23, 24.

The recorded image information can be read by read light RL emitted from a light source LSr and applied to the light-to-light converter assembly PPCAi by a polarizer beam splitter PBS. The read light RL is then modulated by the recorded image information and passes through the polarizer beam splitter PBS and a projection lens Lp, by which the read light RL is projected as a color image onto a screen S. in substantially the same manner as described with reference to FIG. 29.

Figure 33:
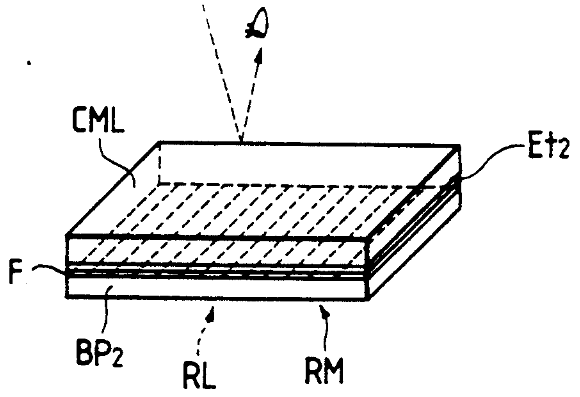
FIG. 33 shows an information recording medium with a color separation filter incorporated therein.

FIG. 33 shows an information recording medium RM with a color separation filter F incorporated therein. Such an information recording medium RM with desired image information recorded in the recording layer CML can be used as a hard copy itself. Specifically, when read right (reproduction light) RL having a predetermined intensity or higher intensity is applied to the information recording medium RM, the read right RL is transmitted through or reflected by the recording medium CML and carries the recorded image information as a pattern of different light intensities. The recorded image information can be visually observed when white read light RL having a predetermined intensity or higher is applied to the information recording medium RM. Since the information recording medium RM can directly be used as a hard copy, no image developing process or no printer is necessary.

Figure 34:
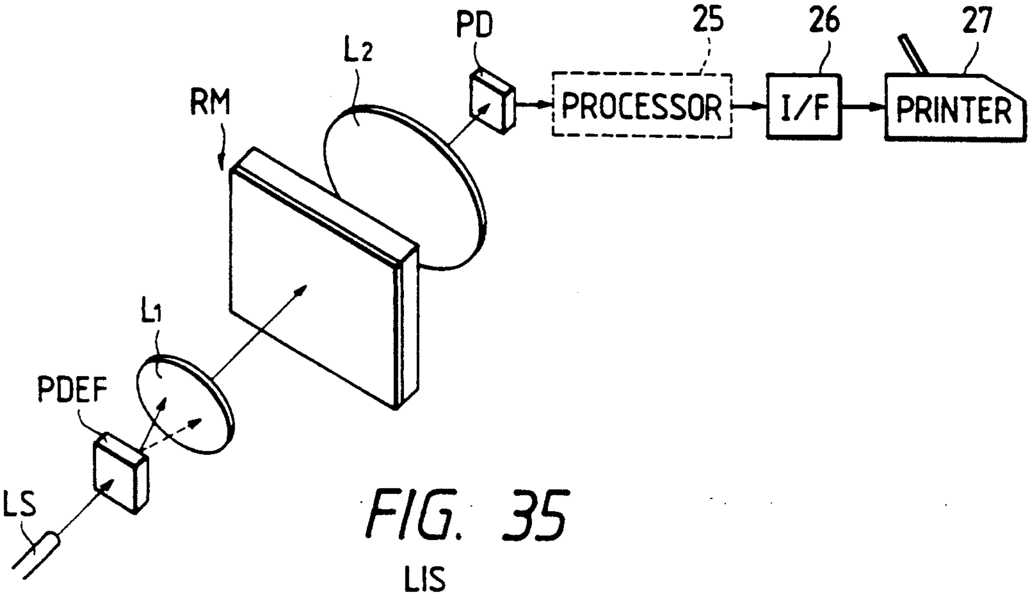
FIGS. 34 through 37 are perspective views of output systems.

FIG. 34 shows an output system for producing a hard copy by recording the image information recorded in the information recording medium RM, in another recording medium. Reproducing light emitted by a light source LS is deflected in horizontal and vertical directions, for example, by a light deflector PDEF to scan the information recording medium RM through a lens L1. The reproducing light as it scans the information recording medium RM passes therethrough and is applied to a photodetector PD by a condensing lens L2. The photodetector PD produces an electric image signal which is processed by a signal processor 25. The processed image signal is then applied through an interface 26 to a printer 27 by which a hard copy with a recorded image is produced.

Figure 35:
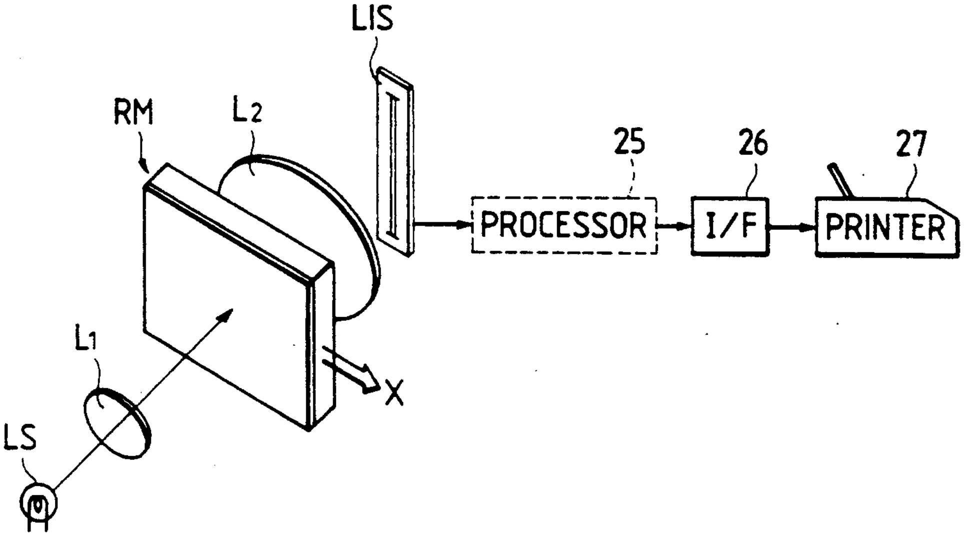

FIG. 35 shows another output system which is similar to the output system shown in FIG. 34 except that the reproducing light which has passed through the information recording medium RM and the lens L2 is applied to a line image sensor LIS. The line image sensor LIS scans the applied reproducing light in a direction normal to the direction indicated by the arrow X in which the information recording medium RM is moved. The line image sensor LIS applies an electric image signal to the signal processor 25.

Figure 36:
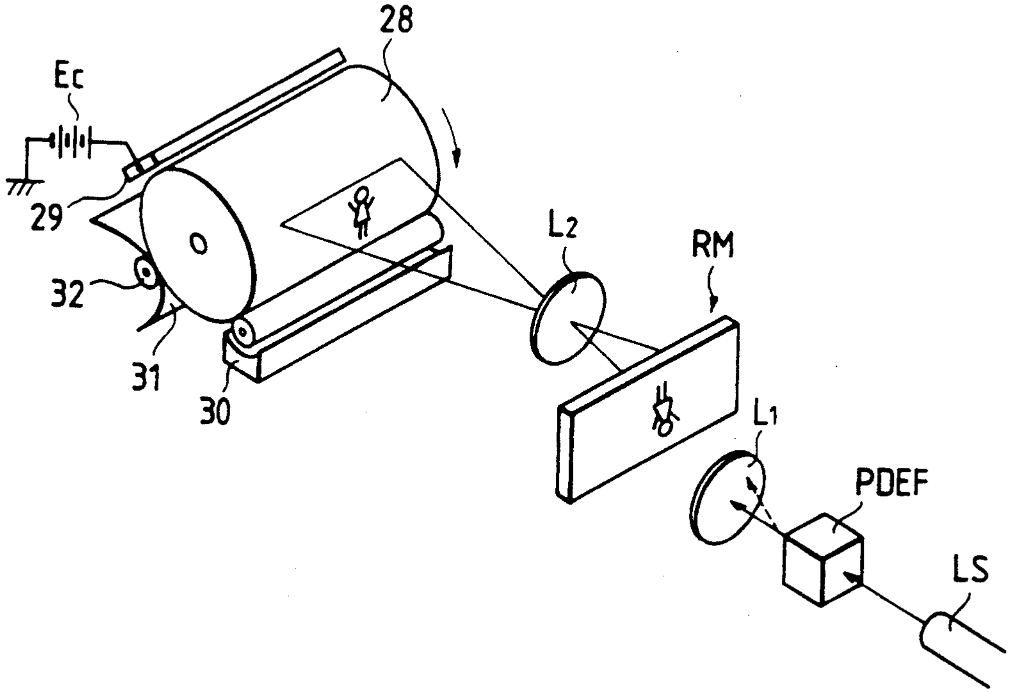

An output system shown in FIG. 36 includes an electrophotographic copying mechanism for producing a hard copy. The reproducing light from the lens L2 is applied to a photosensitive drum 28 which is charged by a corona discharge produced by a charging unit 29 connected to a power supply Ec. When the reproducing light representing an optical image is applied to the photosensitive drum 28, an electrostatic latent image corresponding to the optical image is formed on the photosensitive drum 28. The electrostatic latent image is developed into a visible toner image by toner in a developing unit 30, and then the toner image is transferred onto a recording sheet 31 by a transfer unit 32. The transferred toner image is fixed to the recording sheet 31 by a fixing unit (not shown).

Figure 37:
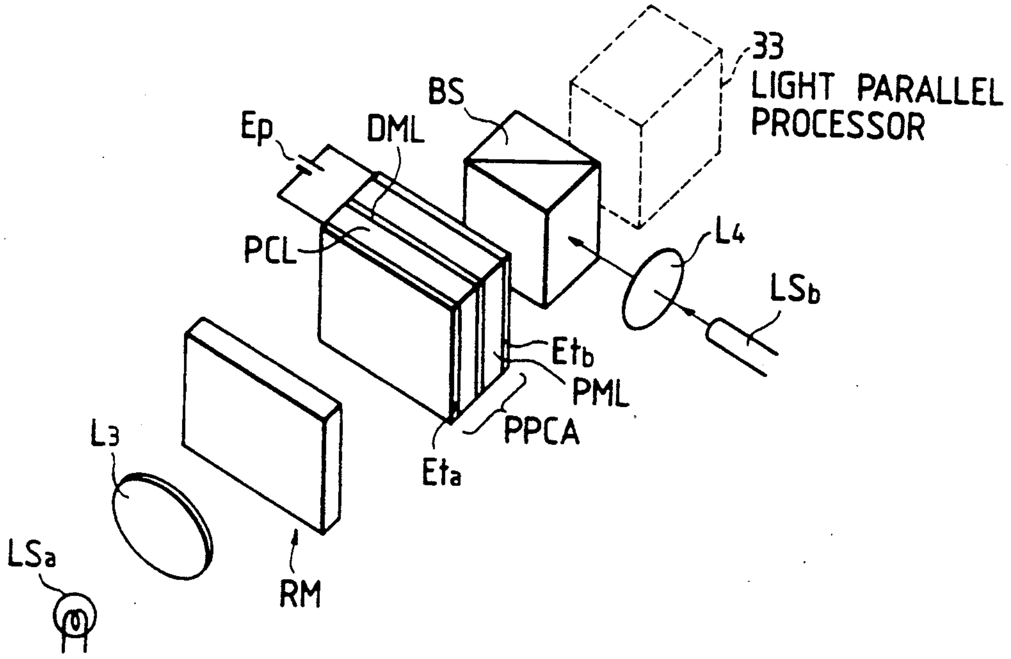

FIG. 37 shows an output system which employs the light-to-light converter assembly PPCA that is of the same construction as the light-to-light converter assembly PPCA shown in FIG. 17. Reproducing light emitted by a light source Lsa passes through the information recording medium RM by which the reproducing light is modulated in intensity by the image information recorded in the information recording medium RM. The reproducing light is then applied to the light-to-light converter assembly PPCA in which it develops an electric charge image in the boundary between the photoconductive layer PCL and the dielectric mirror DML.

Another beam of reproducing light is emitted by a light source LSb and applied through a lens L4 to a beam splitter BS. This reproducing light is applied to and then reflected by the dielectric mirror DML and travels through the beam splitter BS in the same manner as described with reference to FIG. 19. The reproducing light is then applied to a light parallel processor 33 by which it is processed for gain adjustment, gamma correction, matrix processing, and other processing. The processed light is then converted into an electric signal which may be supplied to a printer or an electrophotographic copying machine.

Figure 38:
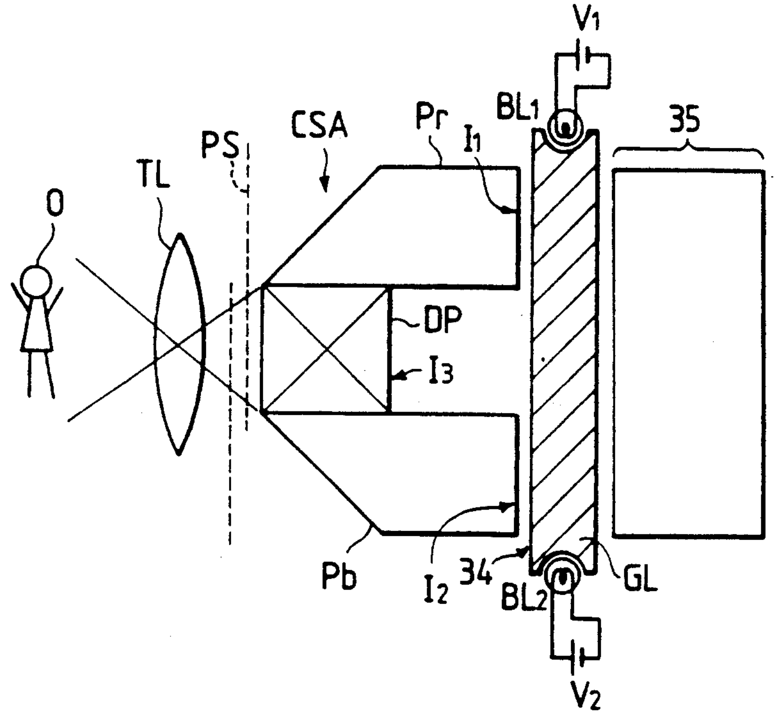
FIGS. 38 through 41 are plan views of color imaging systems according to other embodiments of the present invention.

FIG. 38 shows a color imaging system according to another embodiment of the present invention. The color imaging system shown in FIG. 38 is essentially the same in construction and operation as the color imaging systems according to the previous embodiments, but additionally includes a bias light unit 34 for applying bias light to the photoconductive layer PCL of the image write head WH (see FIG. 1, for example). The image write head WH and the information recording medium RM are collectively referred to as a recording device 35 in FIG. 38. The bias light unit 34 comprises a light guide GL disposed between the trichromatic color separator CSA and the photoconductive layer PCL, for uniformly illuminating the photoconductive layer PCL, a pair of light sources BL1, BL2 such as lamps disposed on opposite sides of the light guide GL, and a pair of power supplies V1, V2 such as batteries for energizing the light sources BL1, BL2, respectively. The light guide GL has a length which is approximately equal to the width of the recording device 35, i.e., the sum of the lengths of image forming surfaces I1, I2, I3 of the prisms Pr, Pb and the dichroic prism DP.

Figure 42:
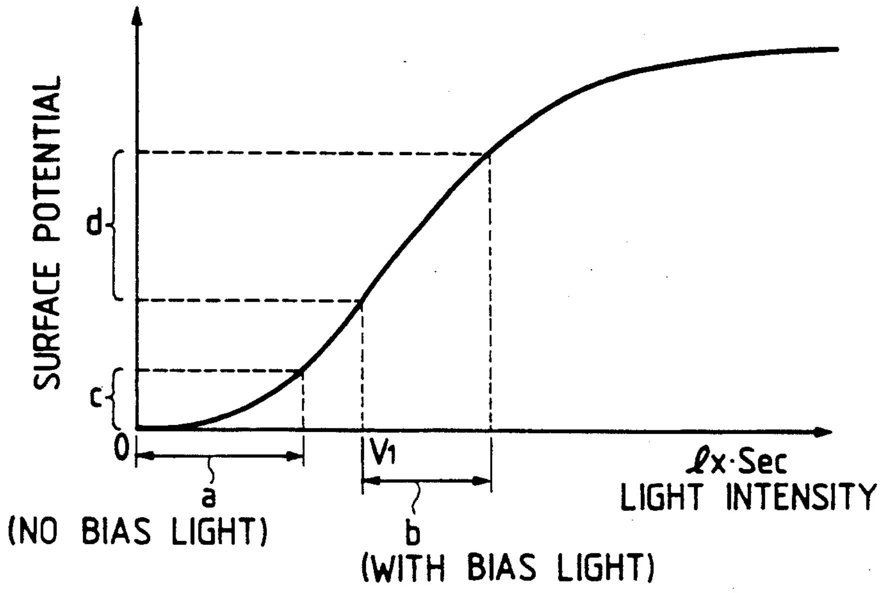
FIG. 42 is a diagram showing the relationship between the intensity of light applied to a photoconductive layer and the surface potential thereof.

FIG. 42 shows the relationship between the intensity of light applied to the photoconductive layer PCL and the surface potential thereof. It can be seen from FIG. 42 that the photoconductive layer PCL has such gamma characteristics that make dark image areas unclear. Generally, when images are actually recorded in the photoconductive layer PCL without bias light, the intensity of light applied to the photoconductive layer PCL is in the range indicated at a in which the surface potential is low as indicated at c. In the range a, the intensity of light is not linearly proportional to the surface potential. Consequently, dark image areas recorded in the photoconductive layer PCL without bias light do not have as distinct gradations as desired, and are unclear.

When bias light is applied to the photoconductive layer PCL by the bias light unit 34, however, the intensity of total light applied to the photoconductive layer PCL varies in the range indicated by b, and the surface potential thereof varies in the range indicated by d. In this range b, the intensity of light varies substantially linearly with the surface potential. Accordingly, images can be recorded with high sensitivity in gradations that are linearly proportional to the intensity of applied light, so that clear electric charge images are developed in the photoconductive layer PCL.

Figure 39:
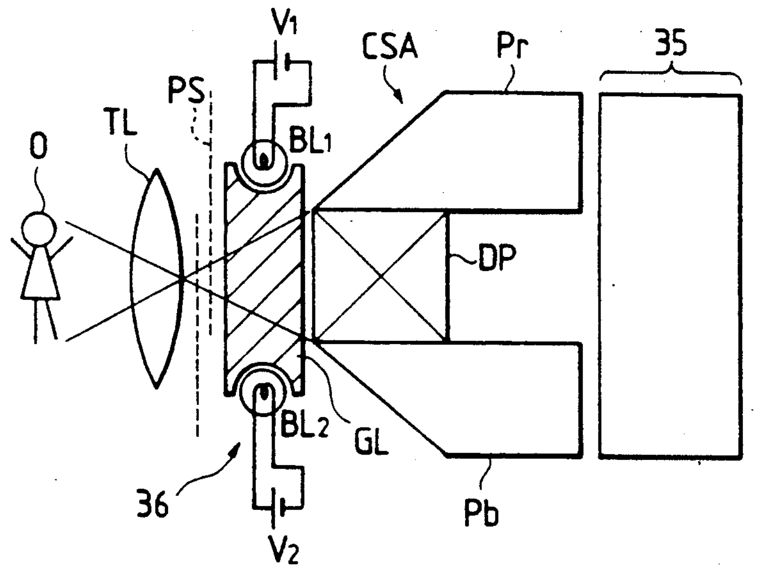

FIG. 39 shows another color imaging system in which a bias light unit 36 is positioned between the optical shutter PS and the trichromatic color separator CSA. Since the light guide GL may be as short as the width of the dichroic prism DP, the bias light unit 36 may be shorter or smaller than the bias light unit 34 shown in FIG. 39.

Figure 40:
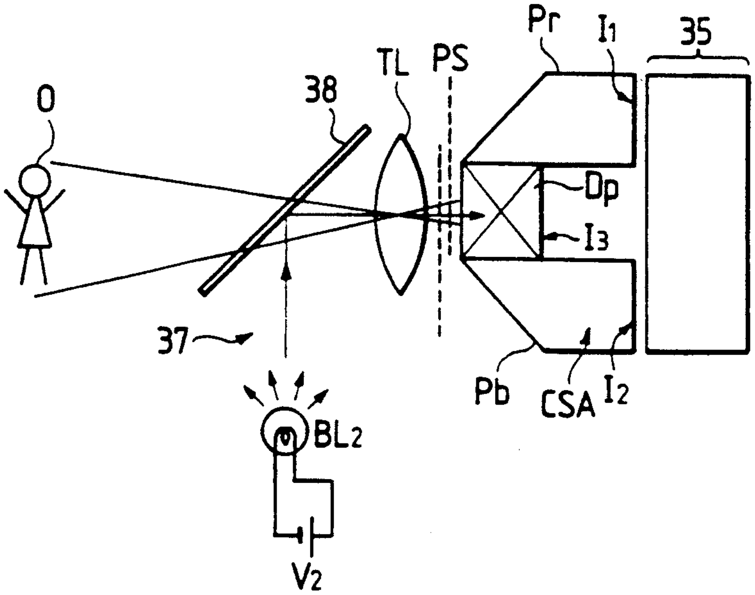

FIG. 40 illustrates still another color imaging system in which a bias light unit 37 includes a half-silvered mirror 38 positioned in front of the lens TL for reflecting bias light emitted by a light source BL2 energized by a power supply V2 into the lens TL and hence the recording device 35.

Figure 41:
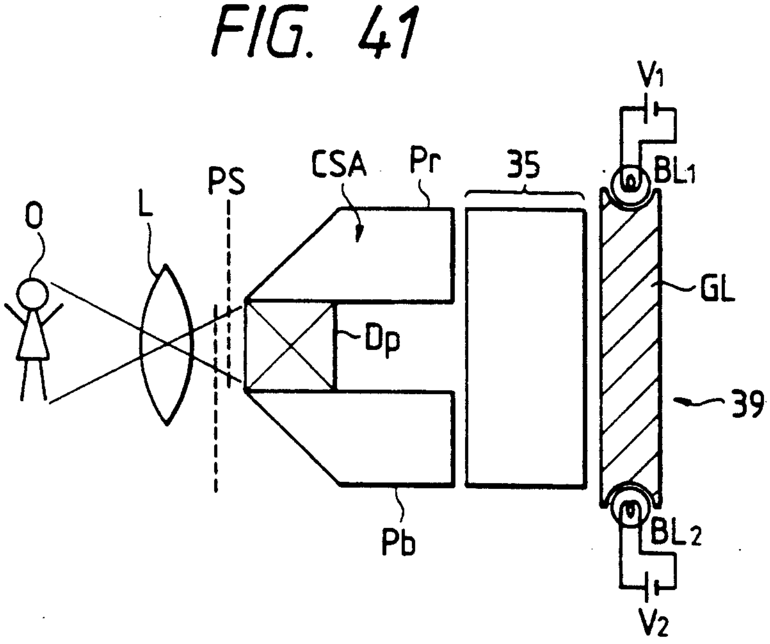

FIG. 41 shows a further color imaging system which has a bias light unit 39, identical to the bias light unit 34, positioned behind the recording device 35 for applying bias light to the photoconductive layer PCL from the side of the recording layer CML in the recording device 35. The recording layer CML should be of a material for passing the wavelengths of the bias light from the bias light unit 39. If the recording layer CML is composed of a high polymer - liquid crystal compound membrane, then liquid crystal molecules react to the optical images from the subject 0 and allow light to pass therethrough. The bias light applied from the bias light unit 39 to the recording medium CML further causes the liquid crystal molecules to react for more bias light to reach the photoconductive layer PCL. As a result, the resistances of the photoconductive layer PCL vary to a larger extent depending on the intensities of the optical images on the photoconductive layer PCL, so that images can be recorded with high sensitivity.

FIGS. 43 through 46 show other color imaging systems each with a bias light unit. The color imaging systems shown in FIGS. 43 through 46 are essentially the same as those shown in FIGS. 38 through 41 except that the recording device 35 is replaced with a recording device 40 which is identical to the light-to-light converter assembly PPCA shown in FIG. 17. In these embodiments shown in FIGS. 43 through 46, the bias light produced by the bias light unit may also be used as erasing light to erase any recorded images while short-circuiting the electrodes Et1, Et2 and closing the optical shutter PS.

Figure 47:
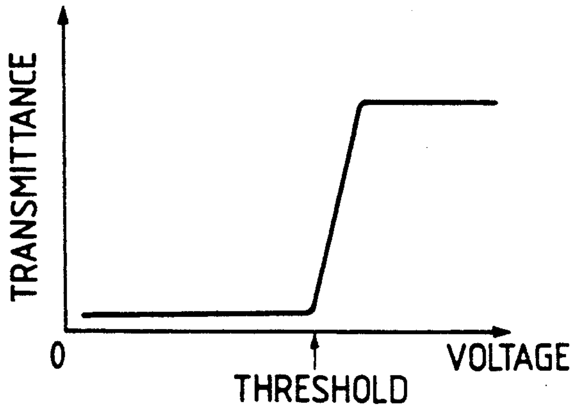
FIG. 47 is a diagram showing the relationship between the voltage applied to a recording layer or a light modulating layer and the transmittance thereof.
Figure 43:
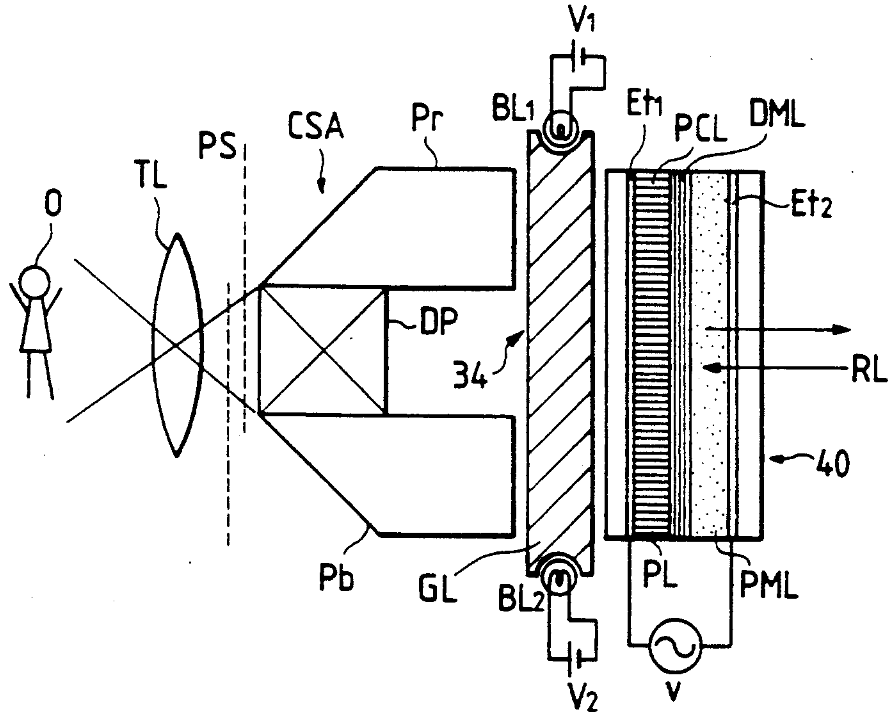
FIGS. 43 through 46 are plan views of color imaging systems according to further embodiments of the present invention.
Figure 44:
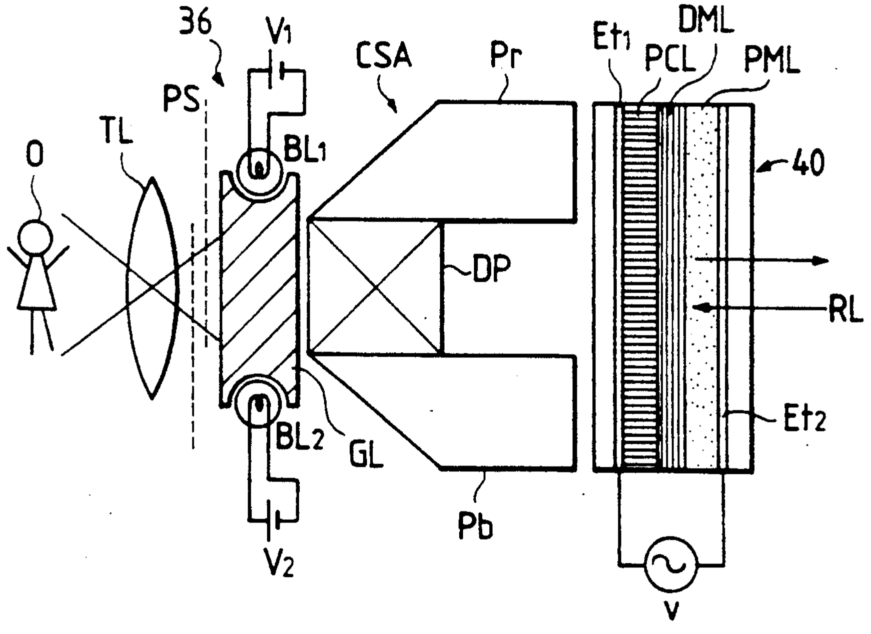
Figure 45:
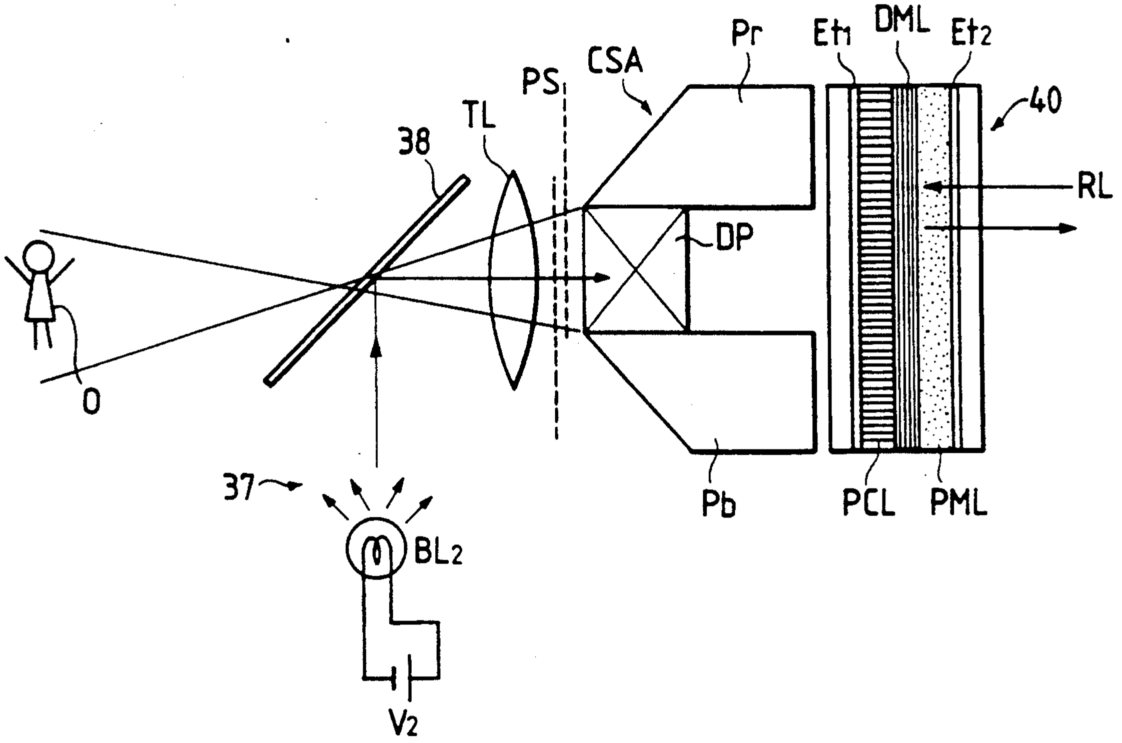
Figure 46:
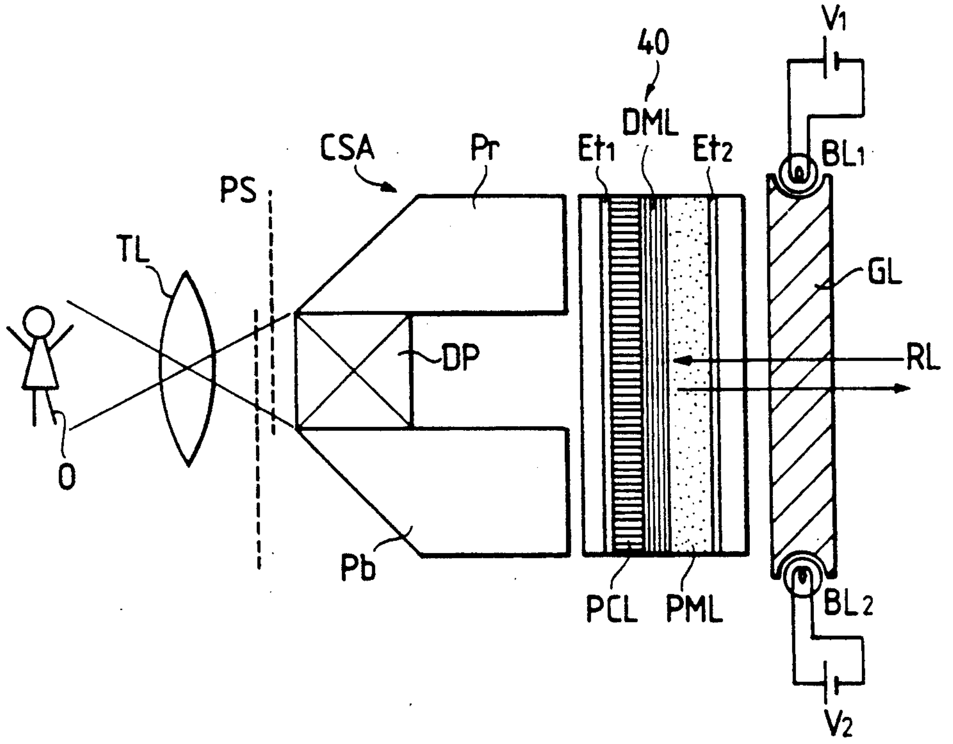

If the recording layer CML or the light modulating layer PML is composed of a material having a very high threshold voltage (see FIG. 47) for operation, such as a high polymer - liquid crystal compound membrane, the voltage to be applied to the photoconductive layer PCL should be high or the photoconductive layer PCL should be made of a material with a high dark current. However, when a high voltage is applied to the photoconductive layer PCL, it may cause a dielectric breakdown, and the high dark current may produce dark current spots or shading.

Figure 48:
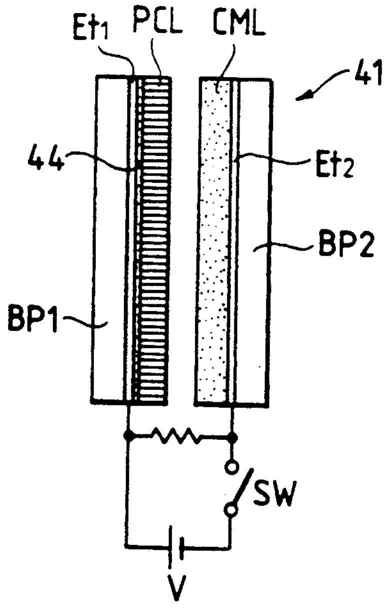
FIGS. 48 through 52 are views of recording devices with blocking layers.
Figure 49:
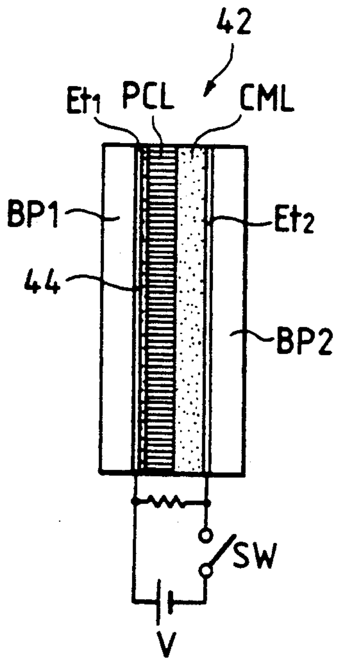
Figure 50:
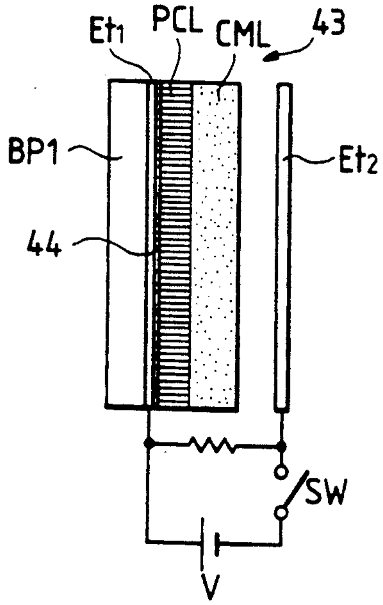

FIGS. 48 through 50 show recording devices 41 through 43, respectively, designed to solve the above problems. Each of the recording devices 48 through 50 includes a blocking layer 44 sandwiched between the photoconductive layer PCL and the electrode Et1, for preventing electric charges from being poured into the photoconductive layer PCL thereby to reduce a dark current. In the recording device 41, the photoconductive layer PCL and the recording layer CML are spaced from each other. In the recording device 42, the photoconductive layer PCL and the recording layer CML are joined to each other. In the recording device 42, the recording layer CML and the electrode Et2 are spaced from each other.

Figure 51:
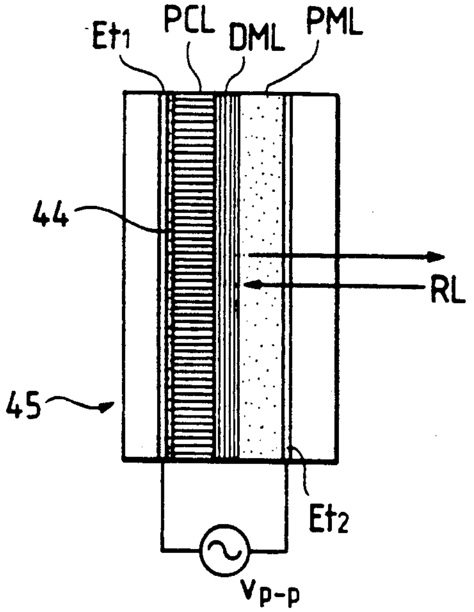

FIG. 51 shows a recording device 45 in the form of the light-to-light converter assembly PPCA. The recording device 45 includes a blocking layer 46 sandwiched between the electrode Et1 and the photoconductive layer PCL.

Figure 52:
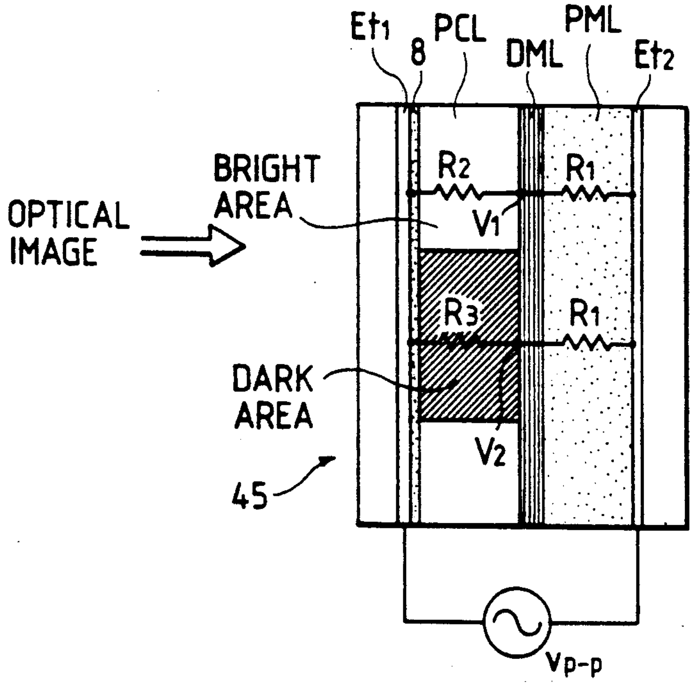

Operation of the recording device 45 will be described with reference to FIG. 52 which shows an equivalent circuit plotted over the recording device 45. It is assumed that the light modulating layer PML between the electrode Et2 and the photoconductive layer PCL (dielectric mirror DML) has a resistance R1, the photoconductive layer PCL has a resistance R2 in a bright image area between the electrode Et1 and the dielectric layer DML, and the photoconductive layer PCL has a resistance R3 in a dark image area between the electrode Et1 and the dielectric layer DML. If a portion of the dielectric mirror DML which contacts the bright image area of the photoconductive layer PCL is at a potential V1, a portion of the dielectric mirror DML which contacts the dark image area of the photoconductive layer PCL is at a potential V2, and a voltage Vp-p is applied between the electrodes Et1, Et2 by a power supply, then the following equations are satisfied:

$$V1 = R1.Vp\text{-}p/(R1+R2)$$

$$V2 = R1.Vp\text{-}p/(R1+R3).$$

Assuming that the resistance R2 is sufficiently smaller than the resistance R3 (R2<<R3), then the voltage V1 is approximately equal to the voltage Vp-p (V1~Vp-p). Since the potential at the bright image area is high, clear images can be obtained as can be understood from FIG. 42.

Instead of the blocking layer 44 between the photoconductive layer PCL and the electrode Et1, a blocking layer may be disposed in the photoconductive layer PCL.

Figure 53:
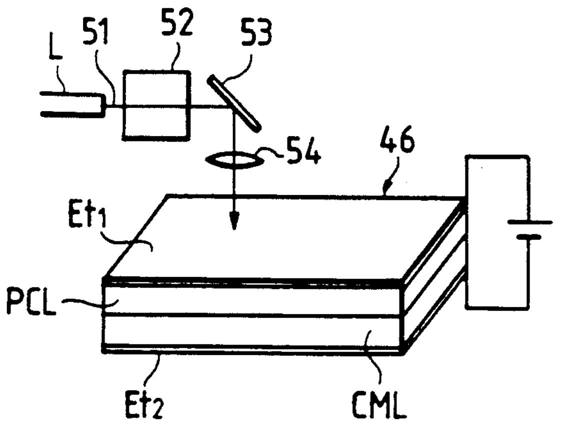
FIG. 53 is a perspective view of an arrangement for recording second information in addition to recorded first information.

FIG. 53 shows an arrangement for additionally recording second information in a recording layer CML in the form of a light modulating layer in which first information has already been recorded. While a DC voltage is being applied between the electrodes Et1, Et2 of a recording device 46 by a power supply Va, a light beam 51 such as a laser beam which is modulated in intensity by the second information is emitted from a light source L and scanned by a light scanner 52, and is reflected by a mirror 53 to pass through a condensing lens 54. The light beam is applied as a light spot to the recording layer CML, thereby recording the second information in a desired area of the recording layer CML.

Figure 54:
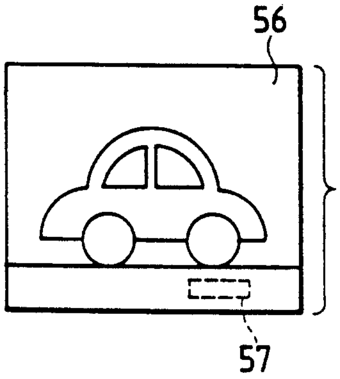
FIG. 54 is a view showing the area where the second information is recorded in addition to the recorded first information.

FIG. 54 shows the recording device 46 in plan. The recording device 46 records an image 56 and includes an area in which the second information is recorded. The second information may be any of various forms of information such as characters, audio signals, or the like, and may be in the form of digital or analog signals. The second information may be recorded as two-dimensional information focused in the area 57, rather than by being scanned with the light spot of the light beam 51. When the second information is recorded, the voltage applied between the electrodes Et1, Et2 by the power supply Va is lower than the voltage which was applied between the electrodes Et1, Et2 when the first information was recorded. In this manner, the second information may be recorded over the first information without modifying the recorded first information.

Figure 55:
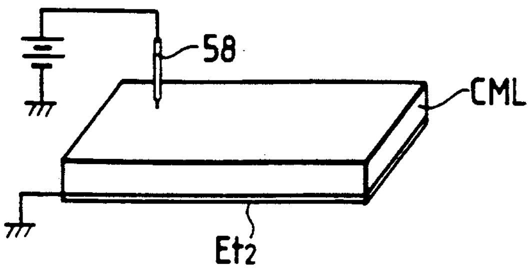
FIG. 55 is a perspective view of another arrangement for recording second information in addition to recorded first information.

FIG. 55 illustrates another arrangement for recording second information in addition to first information. A stylus electrode 58 connected to a DC power supply Vb is moved over the recording layer CML to scan the same for applying an information-modulated voltage to the recording layer CML, thereby recording the second information in the recording layer CML. The stylus electrode 58 may be held in or out of contact with the recording layer CML.

If the area 57 of the recording layer CML in which second information is to be recorded is of saturated or nearly saturated transparency, then a required contrast cannot be achieved even when the second information is recorded in the area. In such a case, the recorded first information is erased only from the area 57, and then the second information is recorded in the area 57 in the manner as shown in FIG. 53 or 55.

Figure 56:
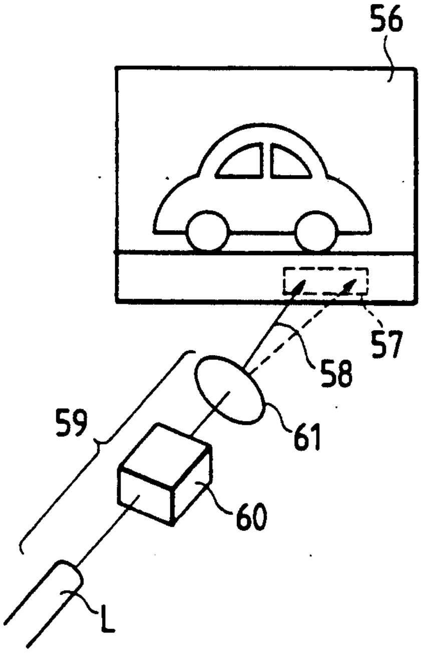
FIG. 56 is a perspective view of an arrangement for erasing recorded first information from the area where second information is to be recorded.

FIG. 56 shows an arrangement for erasing recorded first information from the area 57. A light beam 58 such as a laser beam is applied by an erasing optical system 59 composed of a light source L, a light scanner 60, and a condensing lens 61 to scan the area 57 to erase the recorded first information from the area 57. At this time, the liquid crystal material of the recording layer CML is heated to higher temperature by the light beam which is applied through the photoconductive layer PCL to the recording layer CML in the arrangement shown in FIG. 53 or directly to the recording layer CML in the arrangement shown in FIG. 55. The heated liquid crystal material is rendered opaque for recording additional information. The liquid crystal material of the recording layer CML may be heated by a suitable heater rather than the light beam.

If the transparency of the area 57 of the recording layer CML is saturated, second information to be recorded therein may be converted into thermal energy and the thermal energy may be applied to the area 57. Since the transmittance of the area 57 can be lowered by the application of such thermal energy, the second information can be recorded with a high contrast when the thermal energy is applied. The thermal energy may be produced by converging the intensity-modulated light beam or laser beam, and the area 57 may be scanned by the thermal energy thus produced. Alternatively, the thermal energy may be applied using a thermal head.

In each of the previous embodiments, the power supply for applying a voltage between the electrodes may be a battery or any of various voltage sources.

Figure 57:
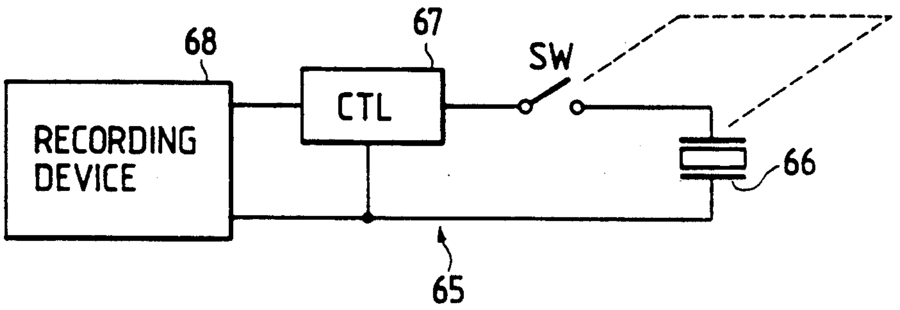
FIG. 57 is a block diagram of a power supply for a recording device.

FIG. 57 shows a voltage source 65 comprising a piezoelectric element 66 which is ganged with a switch SW such as a pushbutton switch. When the switch SW is closed, the piezoelectric element 66 is pressurized by a suitable mechanism to produce a voltage of several hundreds V, for example. The voltage produced by the piezoelectric element 66 is supplied to a control unit 67 which regulates the value of the voltage and the time for which the voltage is to be applied. The regulated voltage is then applied to a recording device or arrangement 68 which typically comprises the image write head WH and the information recording medium RM.

Figure 58:
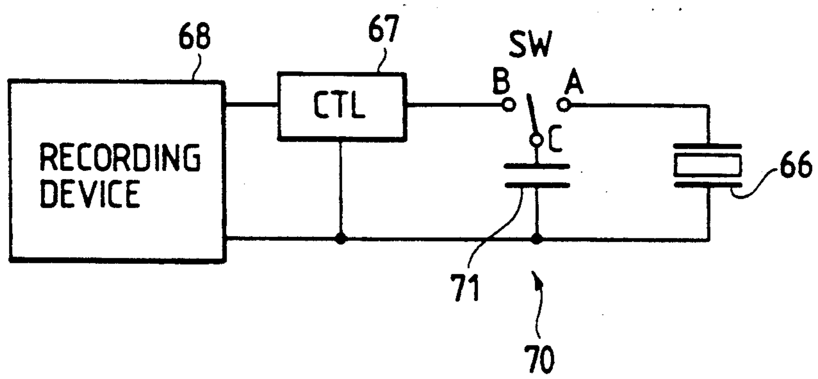
FIG. 58 is a block diagram of another power supply for a recording device.

FIG. 58 shows another voltage source 70 which comprises a piezoelectric element 66, a control unit 67, and a capacitor 71 connected parallel to and between the piezoelectric element 66 and the control unit 67. A switch SW1 has a movable contact C connected to the capacitor 71, a fixed contact A connected to the piezoelectric element 66, and a fixed contact B connected to the control unit 67. The voltage generated by the piezoelectric element 66 is first stored in the capacitor 71 and then supplied to the control unit 67 for the application of a higher voltage to the recording device 68. More specifically, to charge the capacitor 71 with the voltage generated by the piezoelectric element 66, the movable contact C is shifted to the fixed contact A. To subsequently apply the charged voltage to the control unit 67, the movable contact C is shifted to the fixed contact B.

Although certain preferred embodiments have been shown and described, it should be understood that many changes and modifications may be made therein without departing from the scope of the appended claims.

We claim:

1. A color imaging system comprising:

a lens for introducing an optical image of a subject;
color separating means for separating said optical image into a plurality of different color images;
an optical shutter selectively openable for transmitting the optical image of the subject to said color separating means;
photoelectric converting means for converting said different color images into respective electric charge images;
an information recording medium for recording images corresponding to said electric charge images under an electric field;
a power supply for generating said electric field between said photoelectric converting means and said information recording medium;
control means for controlling a timing with which said optical shutter is opened and a timing with which said electric field is generated by said power supply;
input means manually operable for supplying imaging conditions to said control means; and
an optical viewfinder for visual observation of the optical image of the subject introduced by said lens.

2. A color imaging system according to claim 1, further comprising reproducing means for reproducing the images recorded in said information recording medium.

3. A color imaging system according to claim 2, wherein said reproducing means comprises a light source for applying light to said information recording medium, and an image sensor for converting the light that has passed through said information recording medium into an electric signal.

4. A color imaging system according to claim 2, wherein said reproducing means comprises an electrode array for electrostatically detecting the images recorded in said information recording medium.

5. A color imaging system according to claim 2, wherein said reproducing means comprises a linear light source for applying a line of light to said information recording medium, and a line image sensor for detecting the line of light that has passed through said information recording medium into a electric signal.

6. A color imaging system according to claim 1, further comprising audio information recording means for recording audio information on said information recording medium.

7. A color imaging system according to claim 1, wherein said color separating means is disposed between said lens and said photoelectric converting means.

8. A color imaging system according to claim 1, wherein said color separating means and said photoelectric converting means are joined to each other.

9. A color imaging system according to claim 1, wherein said color separating means and said information recording medium are joined to each other.

10. A color imaging system according to claim 1, wherein said photoelectric converting means and said information recording medium are spaced from each other.

11. A color imaging system according to claim 1, wherein said photoelectric converting means and said information recording medium are joined to each other.

12. A color imaging system according to claim 1, wherein said information recording medium includes a charge storage layer for storing the images as electric charges.

13. A color imaging system according to claim 1, wherein said information recording medium includes a light modulating layer for storing the images as optical property variations.

14. A color imaging system according to claim 1, wherein said photoelectric converting means includes a first electrode and said information recording medium includes a second electrode, one of said first and second electrodes being divided into a plurality of electrodes positioned in respective imaging areas which correspond in position to said different color images, said control means comprising means for individually controlling recording of the images in said information recording medium in said imaging areas, respectively.

15. A color imaging system according to claim 14, wherein said power supply comprises a plurality of power supplies for applying voltages between said plurality of electrodes and the other of said first and second electrodes, said control means comprising means for individually controlling said voltages.

16. A color imaging system according to claim 14, wherein said power supply comprises a plurality of power supplies for applying voltages between said plurality of electrodes and the other of said first and second electrodes, said control means comprising means for individually controlling respective periods of time for which the voltages are applied by said power supplies.

17. A color imaging system comprising:
a lens for introducing an optical image of a subject;
color separating means for separating said optical image into a plurality of different color images;
an optical shutter selectively openable for transmitting the optical image of the subject to said color separating means;
light-to-light converting means for converting said different color images into respective electric charge images, and for converting said electric charge images into secondary color images, respectively, under an electric field;
a power supply for generating said electric field in said light-to-light converting means; and
control means for individually controlling conversion of said electric charge images into said secondary color images.

18. A color imaging system according to claim 17, wherein said light-to-light converting means includes a first electrode and a second electrode, one of said first and second electrodes being divided into a plurality of electrodes positioned in respective imaging areas which correspond in position to said different color images, and wherein said power supply comprises a plurality of power supplies for applying voltages between said plurality of electrodes and the other of said first and second electrodes, said control means comprising means for individually controlling the voltages, respectively.

19. A color imaging system according to claim 17, wherein said light-to-light converting means includes a first electrode and a second electrode, one of said first and second electrodes being divided into a plurality of electrodes positioned in respective imaging areas which correspond in position to said different color images, and wherein said power supply comprises a plurality of power supplies for applying voltages between said plurality of electrodes and the other of said first and second electrodes, said control means comprising means for individually controlling frequencies of the voltages, respectively.

20. A color imaging system according to claim 17, wherein said light-to-light converting means includes a first electrode and a second electrode, one of said first and second electrodes being divided into a plurality of electrodes positioned in respective imaging areas which correspond in position to said different color images, said power supply comprising a plurality of power supplies for applying voltages between said plurality of electrodes and the other of said first and second electrodes, said control means comprising means for individually controlling the voltages, respectively, and frequencies of the voltages, respectively.

21. A color imaging system according to claim 17, wherein said color separating means and said light-to-light converting means are joined to each other.

22. A color imaging system according to any one of claims 18 through 20, wherein said light to light converting means includes a plurality of dielectric mirrors aligned with said plurality of electrodes, respectively, for carrying the images as electric charges, and a light modulating layer held against said dielectric mirrors, for modulating light reflected from said dielectric mirrors with said electric charges.

23. A color imaging system according to claim 22, wherein said light-to-light converting means further includes means for applying light to said dielectric mirrors through said light modulating mirror.

24. A color imaging system according to claim 1, further comprising reproducing means for reproducing the images recorded in said information recording medium, as a hard copy.

25. A color imaging system according to claim 24, wherein said reproducing means comprises a printer.

26. A color imaging system according to claim 24, wherein said reproducing means comprises an electrophotographic copying machine.

27. A color imaging system according to claim 1, further comprising bias light applying means for applying bias light to said photoelectric converting means.

28. A color imaging system according to claim 27, wherein said bias light applying means comprises a light guide disposed between said color separating means and said photoelectric converting means, and a light source for introducing bias light into said light guide.

29. A color imaging system according to claim 27, wherein said bias light applying means comprises a light guide disposed between said lens and said color separating means, and a light source for introducing bias light into said light guide.

30. A color imaging system according to claim 27, wherein said bias light applying means comprises a half-silvered mirror positioned in front of said lens, and a light source for introducing bias light into said photoelectric converting means via said half-silvered mirror.

31. A color imaging system according to claim 27, wherein said bias light applying means comprises a light guide disposed behind said photoelectric converting means, and a light source for introducing bias light into said light guide.

32. A color imaging system according to claim 17, further comprising bias light applying means for applying bias light to said light-to-light converting means.

33. A color imaging system according to claim 32, wherein said bias light applying means comprises a light guide disposed between said color separating means and said light-to light converting means, and a light source for introducing bias light into said light guide.

34. A color imaging system according to claim 32, wherein said bias light applying means comprises a light guide disposed between said lens and said color separating means, and a light source for introducing bias light into said light guide.

35. A color imaging system according to claim 32, wherein said bias light applying means comprises a half-silvered mirror positioned in front of said lens, and a light source for introducing bias light into said light-to-light converting means via said half-silvered mirror.

36. A color imaging system according to claim 32, wherein said bias light applying means comprises a light guide disposed behind said light to-light converting means, and a light source for introducing bias light into said light guide.

37. A color imaging system according to claim 1, wherein said photoelectric converting means comprises an electrode connected to said power supply, a photoconductive layer, and a blocking layer sandwiched between said electrode and said photoconductive layer, for preventing electric charges from being introduced from said electrode into said photoconductive layer.

38. A color imaging system according to claim 17, wherein said light-to-light converting means comprises an electrode connected to said power supply, a photoconductive layer, and a blocking layer sandwiched between said electrode and said photoconductive layer, for preventing electric charges from being introduced from said electrode into said photoconductive layer.

39. A color imaging system according to claim 1 or 17, further comprising recording means for recording additional information in an area of said information recording layer in which said images have been recorded.

40. A color imaging system according to claim 39, further comprising erasing means for partly erasing any image from said area before the additional information is recorded in said area by said recording means.

41. A color imaging system according to claim 40, wherein said erasing means comprises means for thermally erasing any image from said area.

42. A color imaging system according to claim 1 or 17, wherein said power supply comprises a piezoelectric element.

* * * * *